(12) United States Patent
Cela

(10) Patent No.: US 10,541,984 B2
(45) Date of Patent: Jan. 21, 2020

(54) HARDWARE-ACCELERATED PAYLOAD FILTERING IN SECURE COMMUNICATION

(71) Applicant: Microsoft Technology Licensing, LLC, Redmond, WA (US)

(72) Inventor: Carlos Jose Cela, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 244 days.

(21) Appl. No.: 15/632,865

(22) Filed: Jun. 26, 2017

(65) Prior Publication Data

US 2018/0278583 A1 Sep. 27, 2018

Related U.S. Application Data

(60) Provisional application No. 62/475,159, filed on Mar. 22, 2017.

(51) Int. Cl.
*H04L 29/06* (2006.01)
*H04L 9/32* (2006.01)

(52) U.S. Cl.
CPC ........ *H04L 63/0435* (2013.01); *H04L 9/3242* (2013.01); *H04L 63/0227* (2013.01);
(Continued)

(58) Field of Classification Search
CPC ... H04L 63/0428; H04L 63/12; H04L 63/123; H04L 67/28
See application file for complete search history.

(56) References Cited

U.S. PATENT DOCUMENTS 5,594,869 A * 1/1997 Hawe ...................... H04L 29/06
370/474
5,870,474 A * 2/1999 Wasilewski ......... H04L 63/0442
348/E5.004
(Continued)

FOREIGN PATENT DOCUMENTS

CN 103209169 A 7/2013
WO 2005060202 A1 6/2005
WO 2016196943 A1 12/2016

OTHER PUBLICATIONS

Hamilton, et al., "Implementation of a Secure TLS Coprocessor on an FPGA", In Journal of Microprocessors and Microsystems, vol. 40, Feb. 1, 2016, pp. 167-180.
(Continued)

*Primary Examiner* — Ponnoreay Pich
(74) *Attorney, Agent, or Firm* — Liang IP, PLLC

(57) ABSTRACT

Computing systems, devices, and associated methods of managing secure communication using hardware accelerators are disclosed herein. In one embodiment, a method includes receiving a data request from a user kernel requesting to read a message stored in a buffer. In response to receiving the data request, transmitting to a processor, data representing a request to validate content in the message. The method also includes receiving from the processor, data representing a validation result containing an indication whether the content in the message is valid and a header size of the message. When the indication indicates that the content of the message is valid, a header of the message is removed from the message according to the header size in the validation result to extract the payload and providing the extracted payload to the user kernel.

20 Claims, 16 Drawing Sheets

(52) U.S. Cl.
CPC ...... *H04L 63/0245* (2013.01); *H04L 63/0263* (2013.01); *H04L 63/061* (2013.01); *H04L 63/1441* (2013.01); *H04L 63/166* (2013.01); *H04L 63/18* (2013.01); *H04L 69/22* (2013.01); *H04L 63/0209* (2013.01); *H04L 63/14* (2013.01)

(56) References Cited

U.S. PATENT DOCUMENTS

| | | | |
|---|---|---|---|
| 6,041,058 | A | 3/2000 | Flanders et al. |
| 6,657,956 | B1 | 12/2003 | Sigaud |
| 8,990,901 | B2 | 3/2015 | Aravindakshan et al. |
| 9,515,658 | B1 | 12/2016 | Chen et al. |
| 9,628,455 | B2 | 4/2017 | Ayyadevara et al. |
| 9,930,067 | B1 | 3/2018 | Johansson et al. |
| 10,218,682 | B1 | 2/2019 | Kawach et al. |
| 2003/0023767 | A1 | 1/2003 | Brabson et al. |
| 2004/0250059 | A1 | 12/2004 | Ramelson et al. |
| 2008/0046727 | A1 | 2/2008 | Kanekar et al. |
| 2011/0258432 | A1 | 10/2011 | Rao et al. |
| 2012/0284506 | A1 | 11/2012 | Kravitz et al. |
| 2014/0304498 | A1 | 10/2014 | Gonuguntla et al. |
| 2016/0072709 | A1 | 3/2016 | Moore |
| 2016/0204851 | A1 | 7/2016 | Li et al. |
| 2017/0013015 | A1 | 1/2017 | Dinha et al. |
| 2018/0278588 | A1 | 9/2018 | Cela et al. |

OTHER PUBLICATIONS

MAXCDN Blog, "The SSL Performance Myth, and Tips for Making Secure Connections Fast", Retrieved From: https://www.maxcdn.com/blog/ssl-performance-myth/, Feb. 19, 2015, 7 Pages.

"International Search Report and Written Opinion Issued in PCT Application No. PCT/US2018/022283", dated May 24, 2018, 15 Pages.

"International Search Report and Written Opinion Issued in PCT Application No. PCT/US2018/022123", dated May 24, 2018, 14 Pages.

"Non Final Office Action Issued in U.S. Appl. No. 15/630,476", dated Jul. 29, 2019, 22 Pages.

* cited by examiner

HARDWARE-ACCELERATED PAYLOAD FILTERING IN SECURE COMMUNICATION

CROSS-REFERENCE TO RELATED APPLICATION(S)

This application claims priority to U.S. Provisional Application No. 62/475,159, filed on Mar. 22, 2017, the disclosure of which is incorporated herein in its entirety.

BACKGROUND

In computing, hardware acceleration generally involves using hardware circuits to perform functions more quickly and efficiently than executing software on general purpose processors. Examples of hardware acceleration include acceleration of bit block transfers in graphics processing units and regular expression for spam control in servers. Hardware devices that perform such acceleration are referred to as hardware accelerators when being separate from a central processing unit ("CPU") in a computer. Example hardware accelerators include cryptographic accelerators, video processors, 3D graphics accelerators, artificial intelligence accelerators, regular expression accelerators, etc.

Hardware accelerators can be implemented as Application Specific Integrated Circuits ("ASICs") that are customized during fabrication for desired uses or Field-Programmable Gate Arrays ("FPGAs") that are configurable by a user after manufacturing. FPGA configuration can be specified using a hardware description language similar to that used for ASICs. FPGAs typically include an array of logic blocks and a hierarchy of reconfigurable interconnects that allow the logic blocks to be "wired together" like logic gates. As such, a user can configure logic blocks in FPGAs to perform complex combinational functions, or merely simple logic operations to synthetize equivalent functionality executable in hardware at much faster speeds than in software.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain hardware acceleration implementations involve using Secure Sockets Layer ("SSL") or Transport Layer Security ("TLS") protocol to secure data streams passing through hardware accelerators. For example, during a secured Hypertext Transfer Protocol ("HTTPS") communications session, hardware accelerators may be utilized to process encrypted data streams between a sender (e.g., a server) and a receiver (e.g., a client device) or vice versa. The secure communications session can be established by first negotiating encryption and other parameters/algorithms between the sender and the receiver. Upon mutual agreement, a connection is instantiated within the session, and the sender and receiver can then encrypt and decrypt data with the mutually agreed security parameters/algorithms and exchange secured data between the sender and the receiver.

Negotiation operations for establishing a secure communications channel (e.g., a session utilizing an associated connection) can be complex. Example negotiation operations start with a handshake stage that can include exchange of certificates and a compression method, cipher suite negotiation, authentication, key exchange, etc. Such complexity can render FPGAs (or other suitable types of programmable hardware circuitry) unsuitable for supporting a complete security protocol in hardware. Synthesized circuits in FPGAs for implementing session negotiation may be too large to be practical. As such, an accelerator processor external to a FPGA is often relied upon for handling negotiation operations during establishment of a secure communications channel. The FPGA, on the other hand, may only handle isolated aspects of data transmission for already established secure communication connections, such as TCP/IP and symmetric cryptography operations.

The foregoing limitations of the FPGA may force incoming/outgoing data to go through the accelerator processor for encryption/decryption or other suitable secured data operations during application data processing. As such, overhead of data transfer over a communications bridge (e.g., a Peripheral Component Interconnect Express bridge or "PCIe" bridge) between the FPGA and the accelerator processor may be high. The communications bridge can become a bottleneck because each byte of incoming/outgoing data is transmitted across the communications bridge every time encryption/decryption is needed. In many applications (e.g. video or audio filtering, encoding, or processing), data is typically streamed in, processed, and then streamed out. For such applications, securing the data with SSL/TLS can impose a large overhead in terms of bandwidth over the communications bridge, and thus limiting data throughput of the hardware accelerator.

Several embodiments of the disclosed technology can address at least some of the foregoing difficulties by switching data traffic between an accelerator processor external to a FPGA of a hardware accelerator and a session handler implemented in the FPGA of the hardware accelerator based on types of data carried by the secured data traffic. In certain embodiments, a data router implemented in the FPGA of the hardware accelerator is configured to switch the data traffic by monitoring a value in the header of a received TLS record assembled from packets associated with a secured communication session or connection. When the header contains a value (e.g., APPLICATION_DATA) indicating that the received TLS record contains encrypted application data, the data router in the FPGA can divert the received TLS record to the session handler in the FPGA instead of the accelerator processor.

On the other hand, when the TLS record header contains other values (e.g., CHANGE_CIPHER_SPEC, ALERT, or HANDSHAKE) indicating that the received TLS record contains control data for the secure communications session or connection, the data router redirects the TLS record to the accelerator processor for handling. In other embodiments, the data router can be configured to detect establishment of the secure communications channel by, for example, monitoring for a server/client finished message or via other suitable techniques. In further embodiments, the data router may be combined with the session handler, may include a separate routing device, or may have other suitable configurations.

During initial establishment of a SSL/TLS communications channel with a peer computing device, the data router can be configured to assemble packets into one or more TLS records and route the TLS records containing control data to the accelerator processor. The control data can be related to, for instance, negotiation of cipher suites, authentication of the peer computing device, exchange of random numbers and a pre-master secret, creation of a shared secret key, or other suitable session-establishment operations. The accelerator processor can then process the received TLS records to facilitate handshake, change cipher specification, alert, or other suitable types of operations utilizing SSL/TLS libraries to establish the requested secure communications channel. For example, the accelerator processor can be configured to choose a common cipher suite including a key exchange method, a bulk encryption method, or a message authentication code. The accelerator processor can also be configured to authenticate the peer computing device, perform key exchange, and indicate completion of session establishment.

Once the secure communications channel is established, the accelerator processor can be configured to provide session and connection information to the session handler and/or a crypto kernel in the FPGA. Such session information can include, for instance, a session identification, a session secret key, a cryptographic algorithm identification, a hash algorithm identification, a compression algorithm identification, or other suitable parameters or algorithm identifications. In certain embodiments, the accelerator processor can also be configured to indicate to the data router whether data routing is to be performed for the established secure communications channel. In other embodiments, the data router can be configured to perform data routing for all SSL/TLS sessions and/or connections.

When the data router detects an incoming TLS record with encrypted application data, the data router can then route the received TLS record to the session handler for further processing. The session handler can be configured to transparently handle a subset of an SSL/TLS protocol such as a record layer sub-protocol (or a portion thereof). Using the session and connection information received from the accelerator processor, the session handler can be configured to fragment/combine the received data into a desired data structure, number a sequence of data blocks in the data stream, compress/decompress data in the TLS record payload using the compression algorithm negotiated during handshake, or perform other suitable data operations. In a particular example, the session handler can be configured to decrypt a data stream related to a video stream and forward the decrypted data stream to a video transcoder implemented in the FPGA for fast processing.

In certain implementations, the session handler can be configured to forward portions of the received TLS record payloads (which form the "message" being securely transmitted) to the accelerator processor for inspection of the information contained in the header of the message (i.e., header of the message encapsulated by the SSL/TLS protocol). Example information can include a status code, connection errors, end of file marker, etc. For instance, in certain embodiments, in response to receiving a data request for accessing the decrypted application data in the buffer, the session handler can be configured to transmit a validity request to the accelerator processor along with a beginning portion of the decrypted application data stored in the buffer, which may totally or partially contain a header of the message. In one example, 4 kilobytes of data (or a pointer thereto) may be transmitted to the accelerator processor. In another example, all data in the buffer may be transmitted to the accelerator processor provided a size of the data does not exceed a threshold (e.g., 4 kilobytes). In other examples, the session handler may transmit 8 kilobytes, 16 kilobytes, or other suitable sizes of the data in the buffer to the accelerator processor.

In response to receiving the validity request and the decrypted application data, the accelerator processor can be configured to parse the received decrypted application data and recognize a record header of the message (e.g., recognizing an HTTP header in a HTTPS session) included in the decrypted application data. By examining the message header, the accelerator processor can determine whether a message payload associated with the message header is valid, a message payload (or body) size (e.g., 200 kilobytes), a message header length, or other suitable parameters of the decrypted application data. The accelerator processor can then transmit a validity result containing one or more of the foregoing parameters (e.g., the header size and the payload size) to the session handler.

In response to receiving the validity result, the session handler can remove the message header from the decrypted application data and provide only the message payload to the user kernel when the validity result indicates that the payload is valid. When the validity result indicates that a determination cannot be made based on the received data, the session handler can pause for a predetermined period to allow for more data to arrive and retry the foregoing validity request operations. When the validity result indicates that the message is invalid (e.g., a HTTP header containing a 403 status code), the session handler can discard the message, terminate the secure communications session, indicate an error to the user kernel or to the accelerator processor, or perform other suitable operations.

During application data transmission and/or processing, the data router may detect packets not containing application data. For instance, the peer computing device may initiate a re-negotiation process for the established SSL/TLS communications session by transmitting a packet containing a suitable session management command. In some implementations, the session handler and/or the data router can be configured to renumber, reorder, and/or otherwise modify a sequence identification/number of the incoming and/or outgoing TLS records to be acceptable by the accelerator processor and the remote endpoint. In other implementations, the accelerator processor may be configured to accept TLS records having non-consecutive sequence identifications/numbers.

In certain embodiments, in response to receiving such a TLS record, the data router can be configured to route the incoming TLS record to the accelerator processor instead of to the session handler implemented in the FPGA. In turn, the accelerator processor can execute an appropriate action, such as facilitating a requested re-negotiation process by accessing the SSL/TLS library, perform the re-negotiation with the peer computing device, and indicate success/failure of the re-negotiation or other operation executed. Subsequent to a successful completion of the re-negotiation process, the accelerator processor can be configured to transmit updated session information to the session handler, data router, and/or crypto kernel. As such, the session handler can continue processing packets containing application data TLS records for the established SSL/TLS communications session. Upon completion of the SSL/TLS communications session, the SSL/TLS communications session can be closed on both the accelerator processor and the FPGA.

Several embodiments of the disclosed technology can thus greatly reduce the data flow over the communications bridge between the FPGA and the accelerator processor. As described above, by implementing the session handler in the FPGA to handle application data processing, encryption/decryption of any application data in a data stream would not leave the FPGA and cross the communications bridge to the accelerator processor. Thus, from the accelerator processor's perspective, the communications session appears as if the communications session never receives any data, yet the communications session is valid. From the FPGA's perspective, the communications session appears as if a secured connection is initiated without any handshaking overhead. As such, overhead in terms of data transfer over the communications bridge between the FPGA and the accelerator processor can be reduced to enable higher throughput (e.g., greater than 10 gigabit/second) at the hardware accelerator when compared to other hardware accelerators.

DETAILED DESCRIPTION

Figure 1:
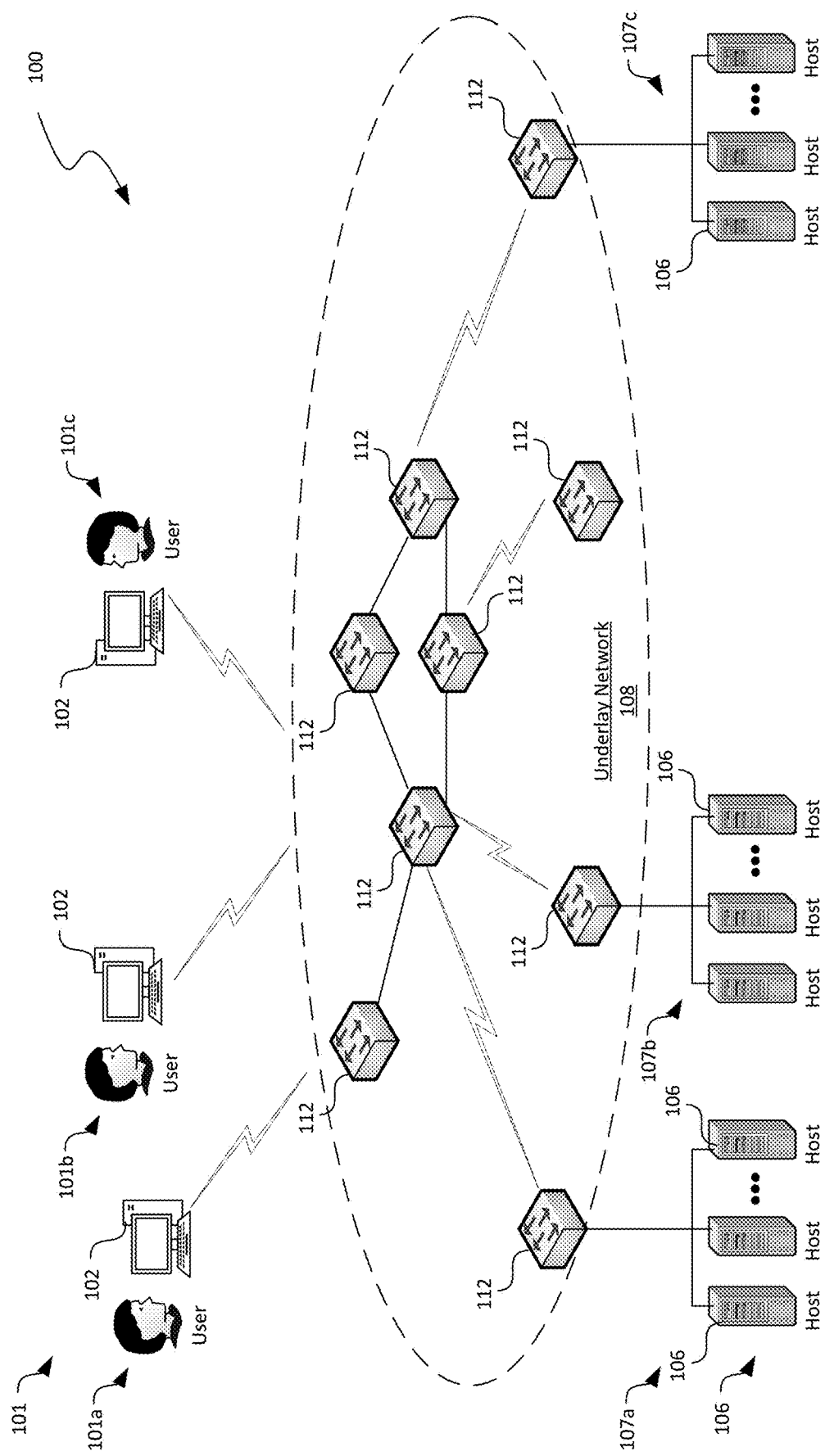
FIG. 1 is a schematic diagram of a distributed computing system implementing secure communication management in accordance with embodiments of the disclosed technology.

Certain embodiments of computing systems, devices, components, modules, routines, and processes for facilitating secure communication management in hardware accelerators are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-10.

As used herein, the term a "distributed computing system" generally refers to a computer network having a plurality of network devices that interconnect a plurality of servers or hosts to one another or to external networks (e.g., the Internet). The term "network device" generally refers to a physical network device, examples of which include routers, switches, hubs, bridges, load balancers, security gateways, or firewalls. A "host" generally refers to a computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can have one or more tenant end points ("TEPs"), for example, virtual machines. The virtual networks can interconnect multiple TEPs on different hosts. Virtual network devices in the overlay network can be connected to one another by virtual links individually corresponding to one or more network routes along one or more physical network devices in the underlay network.

Also used herein, the term "secure communications" generally refers to an exchange of messages containing encrypted or protected data against unauthorized interceptions and/or access. In certain embodiments, SSL/TLS protocols can be applied to secure an exchange of messages. In other embodiments, secure communication can be achieved by implementing other suitable techniques. The term "programmable hardware circuitry" generally refers to a hardware device having configurable logic blocks, switches, or other suitable components. One example programmable hardware circuitry can be an FPGA with logic blocks configurable to synthetize equivalent functionality executable in hardware at much faster speeds than in software.

A secure communications session or "session" involves a corresponding set of encryption parameters, cipher suite, and other suitable parameters agreed upon between a sender and a receiver. A secure communications session can have one or more connections individually related to TCP/IP or other suitable types of underlying data transport link. A session is needed to open a data connection, and a connection can span multiple sessions (e.g. when a cipher protocol is changed without severing the TCP/IP connection). A session can also have many connections, for example, when using the same encryption parameters to connect two end-points over multiple TCP/IP connections individually identified by a combination of an IP address and a TCP port.

Further, as used herein, the term "application data" generally refers to data that is read, generated, modified, or otherwise processed by a user application. For example, a file or digital stream containing video data can be application data for a video editing application. The video editing application can read the file, modify the video data in the file, and output a new file contain the modified video data. In contrast, the term "session management data" generally refers to data exchanged during and for establishment of a secure communication session. For example, session management data can include data contained in handshake, authentication, key exchange, session status indication, or other suitable types of messages.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information. An example data schema for control data is described in more detail below with reference to FIG. 5A.

Hardware-accelerated computing can consume and produce large amounts of data. As such, moving data quickly and securely using SSL/TLS or other suitable security protocols to and from a FPGA in a hardware accelerator can be of interest. Implementing SSL/TLS in hardware, however, is challenging due the complexity of the protocols. As such, currently used solutions are inefficient in terms of power consumed and cost of hardware. The disclosed technology allows use of SSL/TLS or other suitable security protocols to securely transfer data to/from a FPGA of a hardware accelerator while maintaining high throughput and relatively low power consumption. In addition, several embodiments of the disclosed technology can also allow using System-on-Chip ("SoC") systems to implement high-throughput hardware accelerators, as described in more detail below.

FIG. 1 is a schematic diagram illustrating a distributed computing system 100 suitable for implementing secure communication management in accordance with embodiments of the disclosed technology. As shown in FIG. 1, the distributed computing system 100 can include an underlay network 108 interconnecting a plurality of hosts 106 and a plurality of client devices 102. The individual client devices 102 can be associated with corresponding users 101a-101c. Even though particular components of the distributed computing system 100 are shown in FIG. 1, in other embodiments, the distributed computing system 100 can also include network storage devices, maintenance managers, and/or other suitable components (not shown) in addition to or in lieu of the components shown in FIG. 1.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The hosts 106 can individually be configured to provide computing, storage, and/or other suitable cloud services to the individual users 101. For example, as described in more detail below with reference to FIG. 2, each of the hosts 106 can initiate and maintain one or more virtual machines 144 (shown in FIG. 2) upon requests from the users 101. The users 101 can then utilize the instantiated virtual machines 144 to perform computation, communication, data storage, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the individual users 101a-101c.

As shown in FIG. 1, the underlay network 108 can include multiple network devices 112 that interconnect the multiple hosts 106 and the client devices 102. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is coupled to corresponding network devices 112a-112c, respectively, which are commonly referred to as "top-of-rack" or "TOR" network devices. The TOR network devices 112a-112c can then be coupled to additional network devices 112 to form a computer network in a hierarchical, flat, mesh, or other suitable types of topology. The underlay network 108 can allow communications among the hosts 106 and the client devices 102. In other embodiments, the multiple host sets 107a-107c can share a single network device 112 or can have other suitable arrangements.

Figure 2:
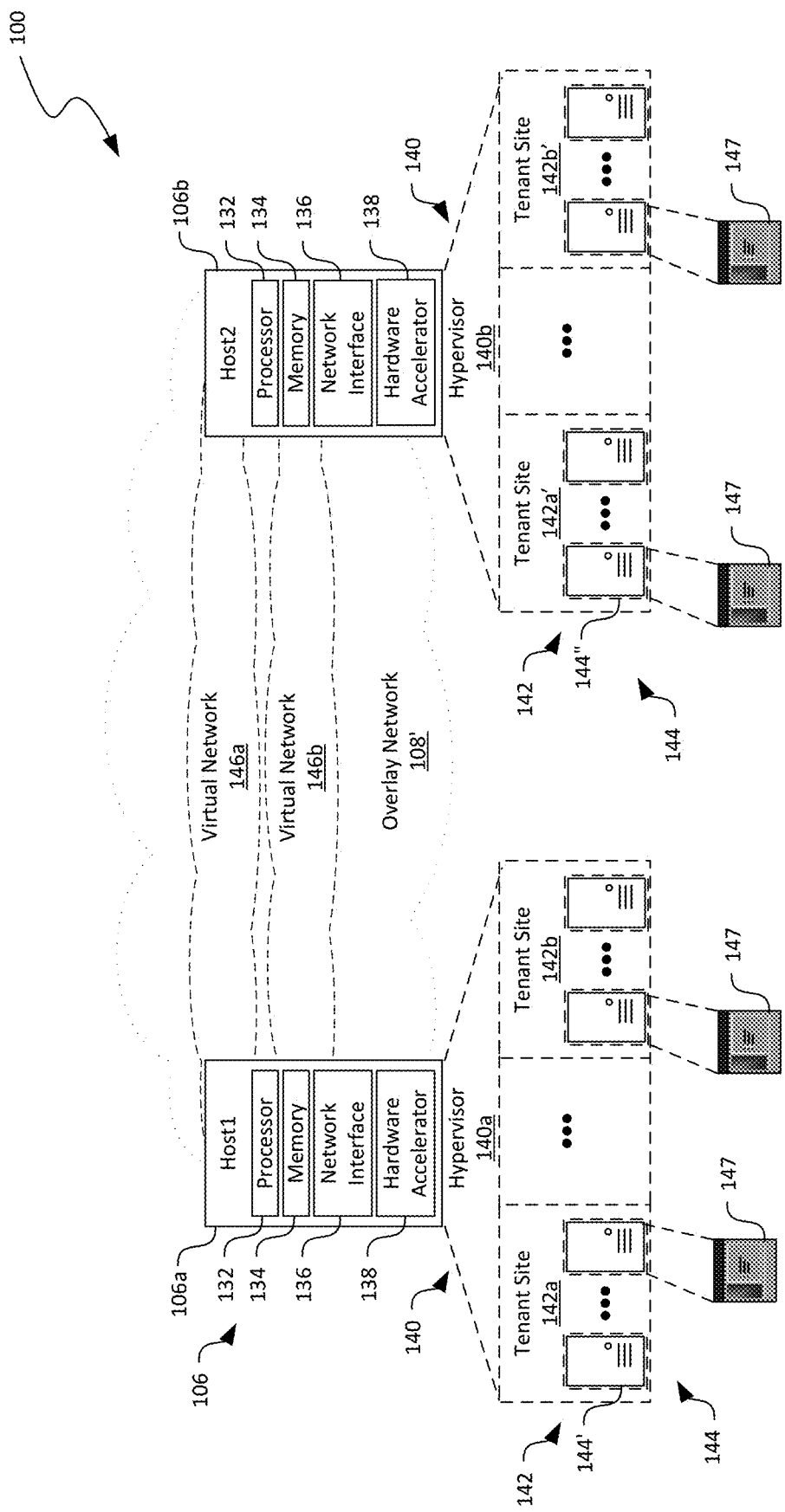
FIG. 2 is a schematic diagram illustrating example hardware/software components of the distributed computing system in FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

As shown in FIG. 2, the first host 106a (shown in FIG. 2 as "Host1") and the second host 106b (shown in FIG. 2 as "Host2") can each include a processor 132, a memory 134, a network interface 136, and a hardware accelerator 138 operatively coupled to one another. The processor 132 can include one or more microprocessors and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed herein). The network interface 136 can include a network interface card ("NIC"), a connection converter, and/or other suitable types of input/output devices configured to accept input from and provide output of digital data to other components on the virtual networks 146. In other embodiments, one of more of the network interfaces 136 can also be integrated with and a part of the hardware accelerator 138.

The first host 106a and the second host 106b can individually contain instructions in the memory 134 executable by the processors 132 to cause the individual processors 132 to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can also include firmware and/or hardware components.

The tenant sites 142 can each include multiple virtual machines 144 for executing suitable tenant applications 147 of a particular tenant 101 (FIG. 1). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or suitable applications. The executed applications can each correspond to one or more cloud computing services or other suitable types of computing services.

Also shown in FIG. 2, the distributed computing system 100 can include an overlay network 108' having one or more virtual networks 146 that interconnect the tenant sites 142a and 142b across the first and second hosts 106a and 106b. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146 or the load balancers 113 (FIG. 1). Thus, different virtual networks 146 can use one or more virtual network addresses that are the same. Example virtual network addresses can include IP addresses, MAC addresses, and/or other suitable addresses.

The hardware accelerators 138 can be configured to synthesize and perform certain functions more efficiently than executing corresponding software applications by the processors 132. In certain implementations, a hardware accelerator 138 can include a programmable hardware circuitry operatively coupled to an accelerator processor (shown in FIGS. 3A-4F) via a communications bridge 158 (shown in FIGS. 3A-4F). The programmable hardware circuitry can be configurable by a host (e.g., an operating system, a hypervisor, a virtual machine, or an application) executing on the accelerator processor to process certain incoming/outgoing packets. Suitable hardware circuitry can include field programmable gate array ("FPGA"), application specific integrated circuitry ("ASIC"), or other suitable hardware components. In the illustrated embodiment, the hardware accelerators 138 are shown as being separate from the network interface 136. In other embodiments, the hardware accelerators 138 and the network interface 136 can be at least partially integrated into a single component, or the hardware accelerators 138 can include one or more integrated network interface (not shown) or other communication interface in addition to those attached to the processor 132. As described in more detail below with reference to FIGS. 3A-4F, the hardware accelerators 138 can be configured to efficiently facilitate secure communication management via the overlay and underlay network 108 and 108'.

In operation, the hosts 106 can facilitate communications among the virtual machines 144 and/or tenant applications 147 executing in the virtual machines 144. For example, the processor 132 can execute suitable network communication operations to facilitate the first virtual machine 144' to transmit packets to the second virtual machine 144" or the second host 106b via the virtual network 146a by traversing the network interface 136 on the first host 106a, the underlay network 108 (FIG. 1), and the network interface 136 on the second host 106b. In accordance with embodiments of the disclosed technology, the hardware accelerators 138 can be configured to facilitate operations of secure data transfer at the hosts 106, as described in more detail below. Even though components and operations of the hardware accelerator 138 are described herein in the context of the distributed computing system 100, embodiments of the hardware accelerator 138 can also be used for other suitable computing systems, such as the client devices 102.

Figure 3A:
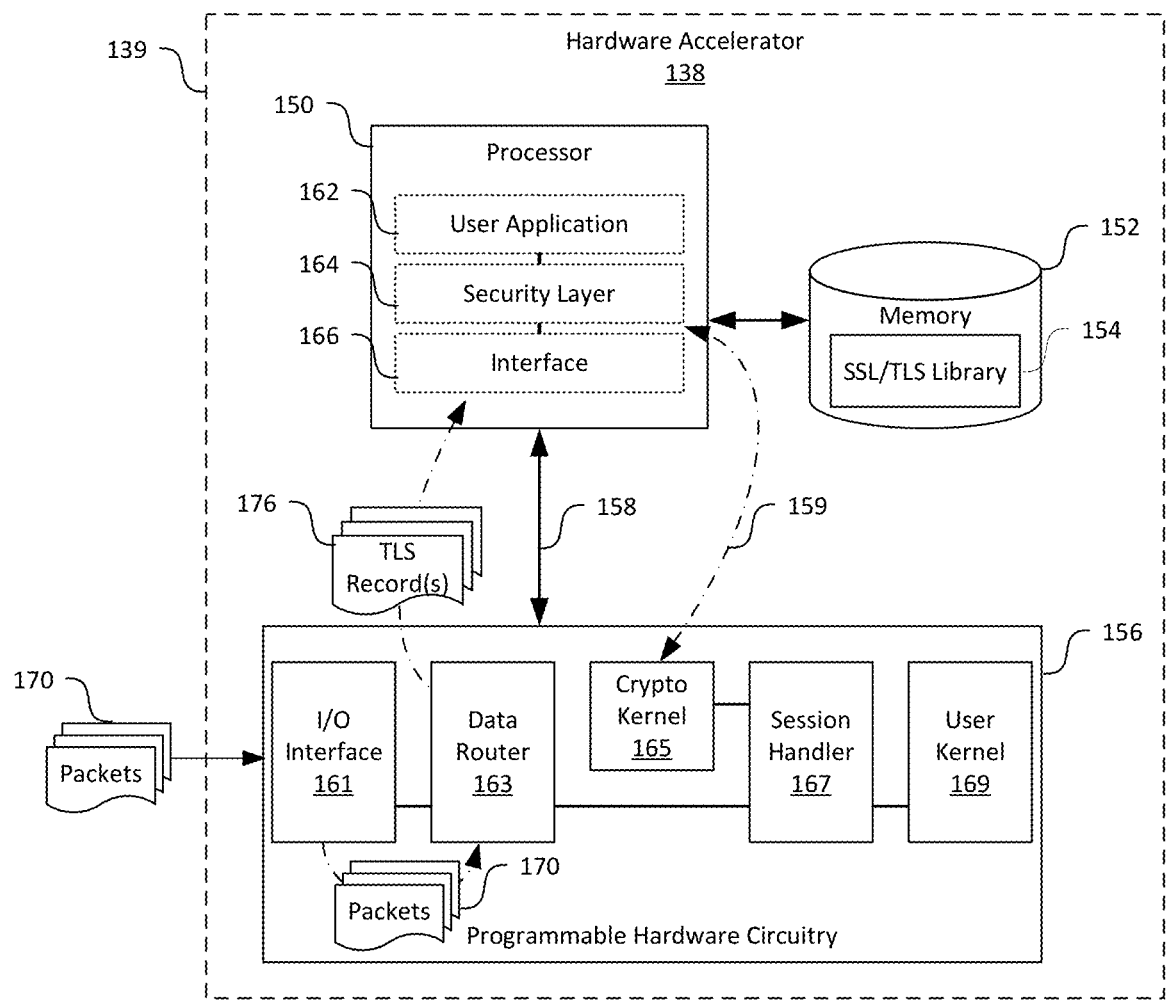
FIGS. 3A-3C are schematic diagrams illustrating certain hardware/software components of a hardware accelerator in FIG. 2 during session establishment in accordance with embodiments of the disclosed technology.
Figure 3B:
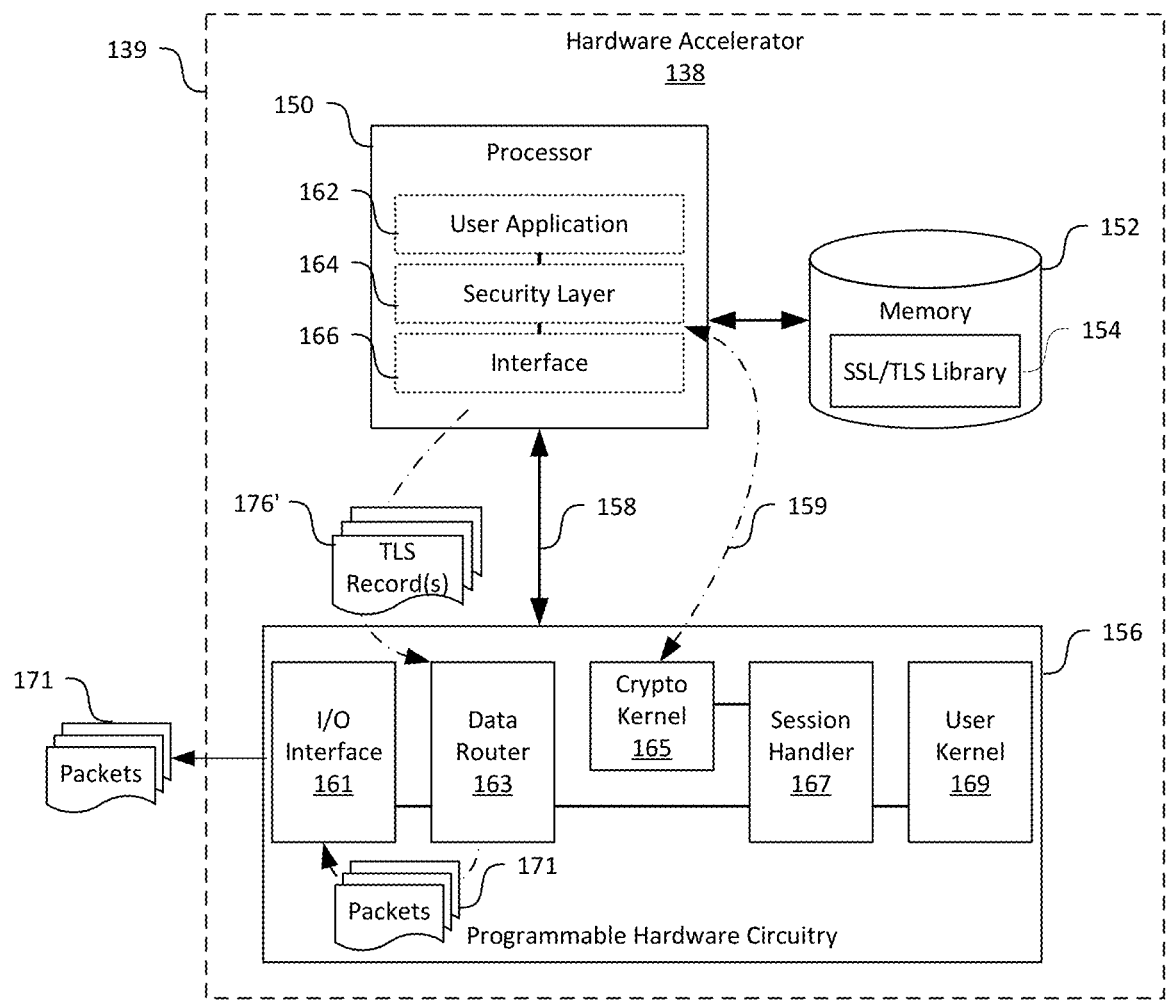
Figure 3C:
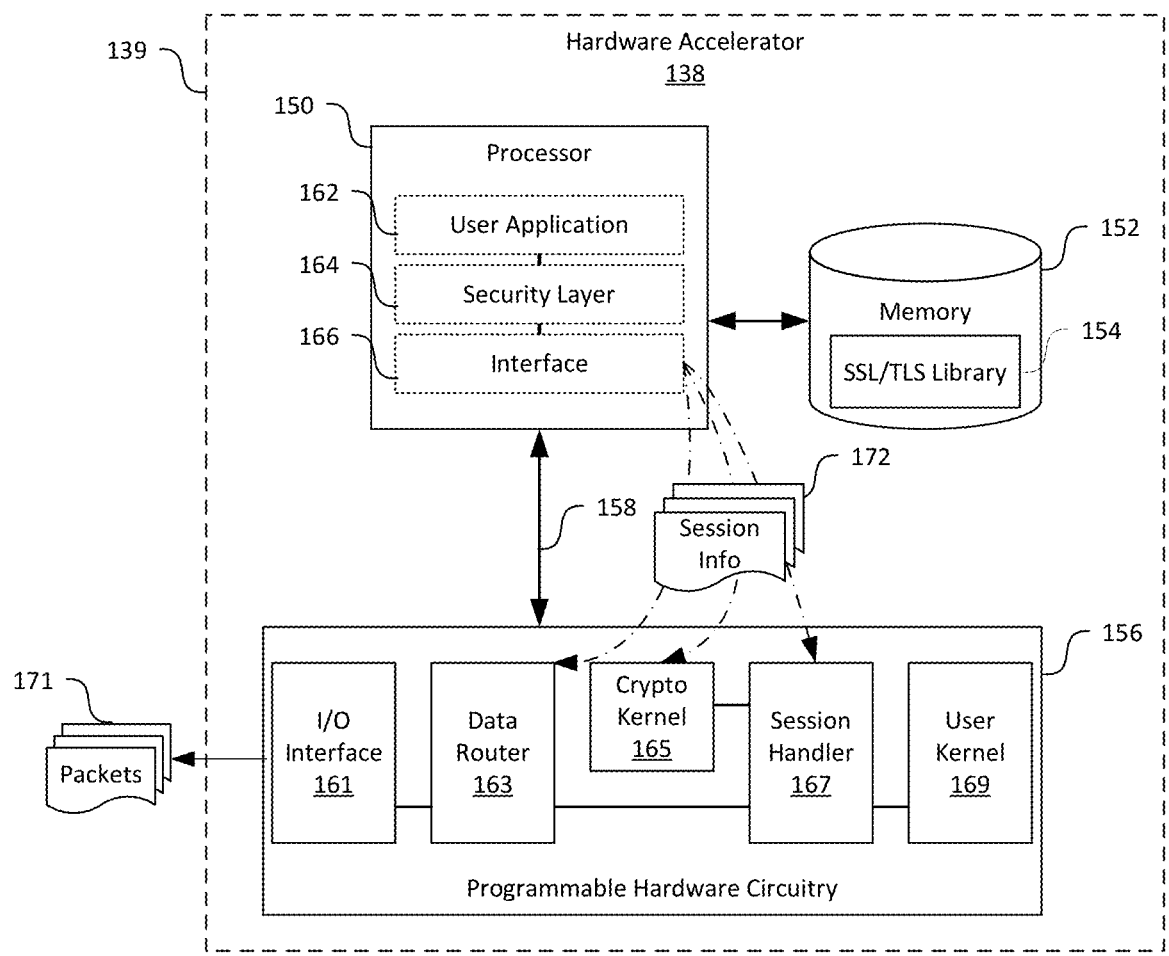

FIGS. 3A-3C are schematic diagrams illustrating certain hardware/software components of a hardware accelerator 138 in FIG. 2 during session establishment of a secure communications channel in accordance with embodiments of the disclosed technology. As shown in FIG. 3A, the hardware accelerator 138 can include a printed circuit board 139 (shown in phantom lines for clarity) or other suitable types of substrate carrying an accelerator processor 150, a memory 152, and to a programmable hardware circuitry 156 coupled to the accelerator processor 150 via a communications bridge 158. As such, the accelerator processor 150 is external to the programmable hardware circuitry 156. Though particular components of the hardware accelerator 138 are shown in FIG. 3A, in other embodiments, the hardware accelerator 138 can also include storage components, power components, or other suitable components (not shown).

The accelerator processor 150 can include one or more microprocessors or other suitable logic devices. The memory 152 can include volatile and/or nonvolatile media (e.g., ROM; RAM, magnetic disk storage media; optical storage media; flash memory devices, and/or other suitable storage media) and/or other types of computer-readable storage media configured to store records of a security protocol library (e.g., the SSL/TLS library 154 shown in FIG. 3A). The memory 152 can also store instructions for the accelerator processor 150 for performing secure communication management, as described in more details below. In other embodiments, the foregoing components of the hardware accelerator 138 may be carried by a single silicon substrate (not shown) to form a SoC device.

The accelerator processor 150 can execute instructions stored in the memory 152 (or other suitable locations) to provide various software components. For example, as shown in FIG. 3A, the accelerator processor 150 can execute instructions to provide a user application 162, a security layer 164, and an interface component 166 operatively coupled to one another. The user application 162 can include any software application configured to perform user desired functions. In one example, the user application 162 can include a video editing application configured to edit a video stream by performing, for instance, transcoding of the video stream or other suitable operations. In other examples, the user application 162 can be a virus scanner, a photo editor, a document editor, a web server, or other suitable types of application. The interface component 166 can include suitable software drivers that allow the user application 162 and/or the security layer 164 to interact with various components of the programmable hardware circuitry 156.

Example software drivers can include a processor-FPGA bridge driver, a TCP/IP communications driver, an accelerated cryptography driver, or other suitable types of drivers.

The security layer 164 can be configured to perform operations related to certain aspects of a security protocol. For example, the security layer 164 can be configured to establish a secure communications channel with a peer computing device (e.g., another host 106 in FIG. 1). The security layer 164 can be configured to handle handshake, change cipher spec, or alert layers of SSL/TLS protocols by accessing the SSL/TLS library 154 in the memory 152. Example operations can include negotiation of cipher suites, authentication of the peer computing device, exchange of random numbers and a pre-master secret, creation of a shared secret key, or other suitable operations. For instance, the security layer 164 can be configured to choose a common cipher suite including a key exchange method, a bulk encryption method, or a message authentication code. The security layer 164 can also be configured to authenticate a peer computing device, perform key exchange, and indicate session establishment complete.

Once the secure communications session is established, the security layer 164 can be configured to provide session and connection information (referred to as "session information 172" herein as shown in FIG. 3C) to the session handler 167 in the programmable hardware circuitry 156 via the interface component 166. Such session information 172 can include, for instance, a session identification, a session secret key, a cryptographic algorithm identification, a hash algorithm identification, a compression algorithm identification, a connection identifier, or other suitable parameters or algorithm identifications. In certain embodiments, the security layer 164 can also be configured to indicate to the data router 163 whether data routing is to be performed for the established secure communications session.

The programmable hardware circuitry 156 can include various hardware circuits configurable by the user application 162 and/or security layer 164 executed by the accelerator processor 150 for performing various functions in hardware. For example, as shown in FIG. 3A, the programmable hardware circuitry 156 can include a I/O interface 161, a data router 163, a crypto kernel 165, a session handler 167, and a user kernel 169 operatively coupled to one another. In certain embodiments, the I/O interface 161 can include circuits configured to perform operations related to Media Access Control layer ("MAC"), IP, TCP, and/or UDP layers. Example of such operations can include frame delimiting and recognition, addressing of destination stations, conveyance of source-station addressing information, transparent data transfer of logical link control, protection against errors by checking frame check sequences, and control of access to a physical transmission medium. In other embodiments, the I/O interface 161 can include only circuits configured to perform operations related to MAC layer but not the TCP/IP layer. In further embodiments, the I/O interface 161 can include other suitable circuits in addition to or in lieu of those related to MAC, IP, TCP, and/or UDP layers.

The crypto kernel 165 can include circuits configured to perform encryption and/or decryption of certain data using an encryption key and according to a selected encryption algorithm, as well as random number generators, hashing engines, and other components suitable for symmetric or asymmetric cryptography. For example, the crypto kernel 165 can include circuits implementing triple Data Encryption Standard ("DES"), the RSA encryption algorithm, the Blowfish algorithm, the Advanced Encryption Standard ("AES"), or other suitable encryption algorithms. Even though the crypto kernel 165 is shown as being implemented in the programmable hardware circuitry 156, in other embodiments, the crypto kernel 165 may be implemented as a software component in the accelerator processor 150. The security layer 164 and/or other components of the hardware accelerator 138 can utilize the crypto kernel 165 to encrypt/decrypt data via the interface component 166, as indicated by the arrow 159. In other embodiments, the foregoing cryptography operations can also be implemented both in the hardware circuit 156 and in the accelerator processor 150. For example, a software cryptography stack (not shown) provided by the accelerator processor 150 can be used to perform asymmetric cryptography operations associated with session negotiation while the crypto kernel 165 in the programmable hardware circuitry 156 can be used for symmetric cryptographic operations associated with application data encryption and decryption. In additional embodiments, the security layer 164 and/or other components of the hardware accelerator 138 may utilize the crypto kernel 165 to encrypt/decrypt data via the interface component 166, as indicated by the arrow 159. In further embodiments, the security layer 164 may utilize the software cryptography stack provided by the processor 150.

The user kernel 169 can include circuits implementing one or more application functions in hardware. In one example, the user kernel 169 can include circuits configured to perform transcoding of a video stream received via the underlay/overlay network 108 and 108'. In another example, the user kernel 169 can include circuits configured to perform lossy or non-lossy compression of a video stream. In other examples, the user kernel 169 can also include circuits configured to perform bit block transfers in graphics processing units, regular expression for spam control, or other suitable functions. The user kernel 169 typically can only process application data in a decrypted form. As such, during a secure communications session, such as a HTTPS session, the user kernel 169 may need to rely upon the accelerator processor 150 for decryption/encryption operations, according to certain implementations.

Relying on the accelerator processor 150 for encryption/decryption, however, can impose a constraint on data throughput of the hardware accelerator 138. For example, an amount of data traversing the communications bridge 158 can be up to four times for input data and four times for output data when utilizing the accelerator processor 150 for encryption/decryption. Such data transfer imposes a constraint in the data throughput of the hardware accelerator 138. Thus, due to a high processing power demand, certain hardware acceleration systems may not be able to handle high speed transfers (e.g., >10 Gb/s). Also, using the accelerator processor 150 can be expensive, complex to integrate, and can demand a large device footprint, and consume a large amount of power.

Several embodiments of the disclosed technology can address at least some of the foregoing difficulties by implementing a data router 163 for switching data traffic between the accelerator processor 150 and the session handler 167 based on types of data carried by the data traffic. In certain embodiments, the data router 163 can assemble a TLS record 176 by aggregating the incoming packets 170 in order to be able to route data contained in the packets 170 at the TLS record level. For example, the data router 163 can be configured to switch the data traffic by monitoring a value in a header of the TLS record 176. When the header of the TLS record 176 contains a value (e.g., CHANGE_CIPHER_SPEC, ALERT, or HANDSHAKE) indicating that the TLS record 176 contains session management data, the data router 163 can be configured to forward the TLS record 176 to the interface component 166 of the accelerator processor 150 for further processing. On the other hand, when the header of the TLS record 176 contains a value (e.g., APPLI-CATION_DATA) indicating that the TLS record 176 contains encrypted application data, the data router 163 can route the TLS record 176 to the session handler 167 instead of the accelerator processor 150 for further processing, as described in more detail below with reference to FIGS. 4A-4E. One example data schema suitable for a header of the packet 170 and the TLS record 176 is described in more detail below with reference to FIGS. 5A-5C.

In other embodiments, the data router 163 can be configured to detect establishment of the secure communications session by, for example, monitoring for a server/client finished message or via other suitable techniques. Though the data router 163 is shown in FIG. 3A as a part of the programmable hardware circuitry 156, in other embodiments, the data router 163 may be a standalone hardware device, a software component provided by the accelerator processor 150, or can have other suitable configurations. One example configuration for the data router 163 is described in more detail below with reference to FIG. 6.

The session handler 167 can be configured to transparently handle a subset of a security protocol. For example, the session handler 167 can be configured to transparently handle a subset of an SSL/TLS protocol such as a record layer sub-protocol (or a portion thereof) for processing application data. Using the session information received from the accelerator processor 150, the session handler 167 can be configured to fragment/combine the received packets into a desired data structure, number a sequence of data blocks in the data stream, compress/decompress data in the packets using the compression algorithm negotiated during handshake, or perform other suitable data operations. In a particular example, the session handler 167 can be configured to use the crypto kernel 165 to decrypt the TLS record payload of a data stream related to a video stream and store the decrypted data in a buffer. As one or more TLS records 176 arrive and are decrypted, the session handler 167 can be configured to partially or totally forward the header of the message encapsulated in the TLS record payload to the processor 150 for a validity check before providing the decrypted packets to the user kernel 169 for further processing. One example configuration for the session handler 167 is described in more detail below with reference to FIG. 7, and operations of validity check are described in more detail below with reference to FIGS. 4A-4E.

FIGS. 3A-3C illustrate certain operation stages during initial establishment of a secure communications channel in accordance with embodiments of the disclosed technology. As shown in FIG. 3A, when the I/O interface 161 receives packets 170, in certain embodiments, the I/O interface 161 can forward the packets 170 to the data router 163 for assembling and routing at TLS record level. In other embodiments, the I/O interface 161 can be configured to assemble the packets 170 into one or more TLS records 176. The data router 163 can then determine whether the TLS record 176 assembled from the packets 170 contains application data or non-application data, such as session management data. In response to determining that the packets 170 do not contain application data, the data router 163 can be configured to forward or otherwise route the TLS record 176 to the interface component 166 of the accelerator processor 150 via the communications bridge 158, as shown in FIG. 3A.

The interface component 166 can then forward the TLS record 176 to the security layer 164 and/or the user application 162 via the interface component 166 for further processing. In certain embodiments, the security layer 164 can utilize the crypto kernel 165 in the programmable hardware circuitry 156 to perform certain encryption/decryption operations on, for example, a payload of the TLS record 176 containing session control data, as indicated by the arrow 159. The security layer 164 can then access the SSL/TLS library 154 and generate additional TLS records 176' as responses to the session management data included in the TLS record 176, as shown in FIG. 3B. The interface component 166 can then transmit the TLS records 176' to the data router 163 and/or the I/O interface 161 at the programmable hardware circuitry 156, which in turn can format or otherwise manipulate the TLS records 176' into packets 171 and transmit the packets 171 to the peer computing device via the overlay/underlay network 108' and 108 of FIG. 1.

The foregoing operations shown in FIG. 3B can be repeated one or more times until a secure communications channel is established. As shown in FIG. 3C, upon establishment of the secure communications channel, the user application 162 and/or the security layer 164 can transmit session information 172 to the session handler 167 to configure the session handler 167 for handling the established secure communications session. The session information 172 can include, for instance, a session identification, a connection identification, a session secret key, a cryptographic algorithm identification, a hash algorithm identification, a compression algorithm identification, or other suitable parameters or algorithm identifications. In certain embodiments, the user application 162 and/or the security layer 164 can also transmit the session information 172 to the data router 163 indicating to the data router 163 whether to route other packets containing application data related to the secure communications channel. In further embodiments, the session information 172 can be transmitted to the crypto kernel 165, to setup an agreed upon encryption algorithm and encryption keys for use to encode or decode data traffic. In yet further embodiments, the session handler 167 and/or the router 163 can relay the foregoing information to the crypto kernel 165.

Figure 4A:
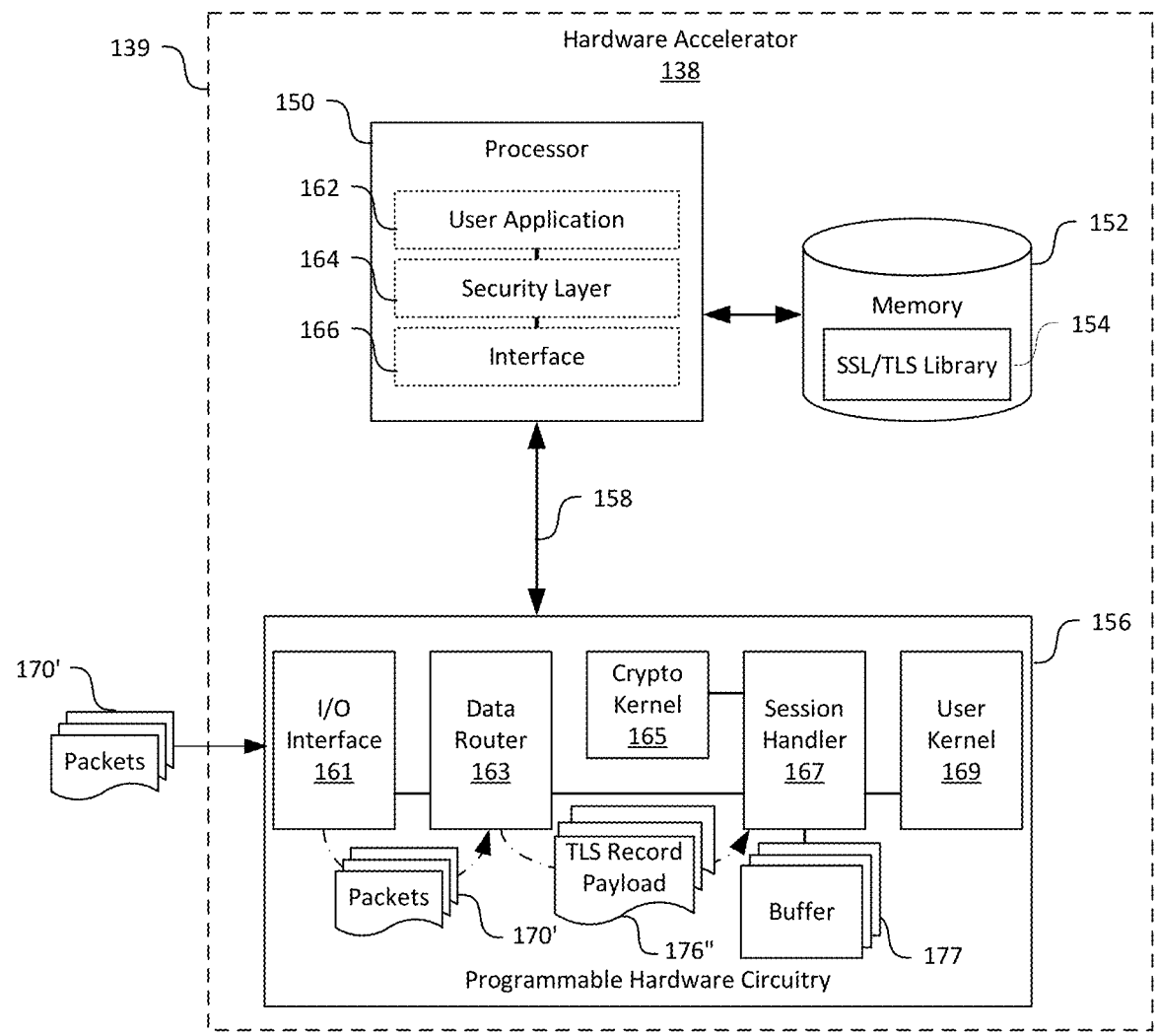
FIGS. 4A-4E are schematic diagrams illustrating certain hardware/software components of a hardware accelerator in FIG. 2 during application data processing in accordance with embodiments of the disclosed technology.

Upon receiving the session information 172, the data router 163, the crypto kernel 165, and the session handler 167 can cooperate to process the TLS records payload 176" containing application data for the secure communications session, as shown in FIGS. 4A-4E. As shown in FIG. 4A, the programmable hardware circuitry 156 can include one or more buffers 177, each of which can be operatively coupled to one connection of the session handler 167. The buffers 177 can include volatile and/or nonvolatile media (e.g., ROM; RAM, magnetic disk storage media; optical storage media; flash memory devices, and/or other suitable storage media) and/or other types of computer-readable storage media configured to store and allow retrieval of data. Though FIGS. 4A-4E show that the buffers 177 being a part of the programmable hardware circuitry 156, in other embodiments, the buffers 177 may be external to the programmable hardware circuitry 156, for example, by being a part of the memory 152.

As shown in FIG. 4A, in operation, the I/O interface 161 can receive packets 170' and forward them to the data router 163, which in turns assembles the packets 170' into TLS records, and decides whether to forward these TLS records to either the accelerator processor 150 (e.g., the TLS records 176, shown in FIG. 3A), or to strip the TLS records of their headers and forward their payloads to the session handler 167 (TLS record payload 176", shown in FIGS. 4A-4D). To make the forwarding decision the data router 163 can assemble the TLS records by aggregating data from the received packets 170' or directly determine whether the incoming TLS records contain application data for the secure communications session or connection. In certain implementations, each TCP/IP connection can be uniquely identified by a combination of IP address and ports of corresponding endpoints, and assigned a connection ID. The processor 150 can update a routing table (not shown) in the data router 163, indicating which connection IDs belong to hardware-accelerated SSL/TLS connections. When an incoming packet with an associated connection ID that matches one of the entries present in the routing table, the data router 163 can queue the packets 170', extract a TLS record header, and then based on the TLS record header to mark whether a corresponding TLS record is associated with application data.

Figure 4B:
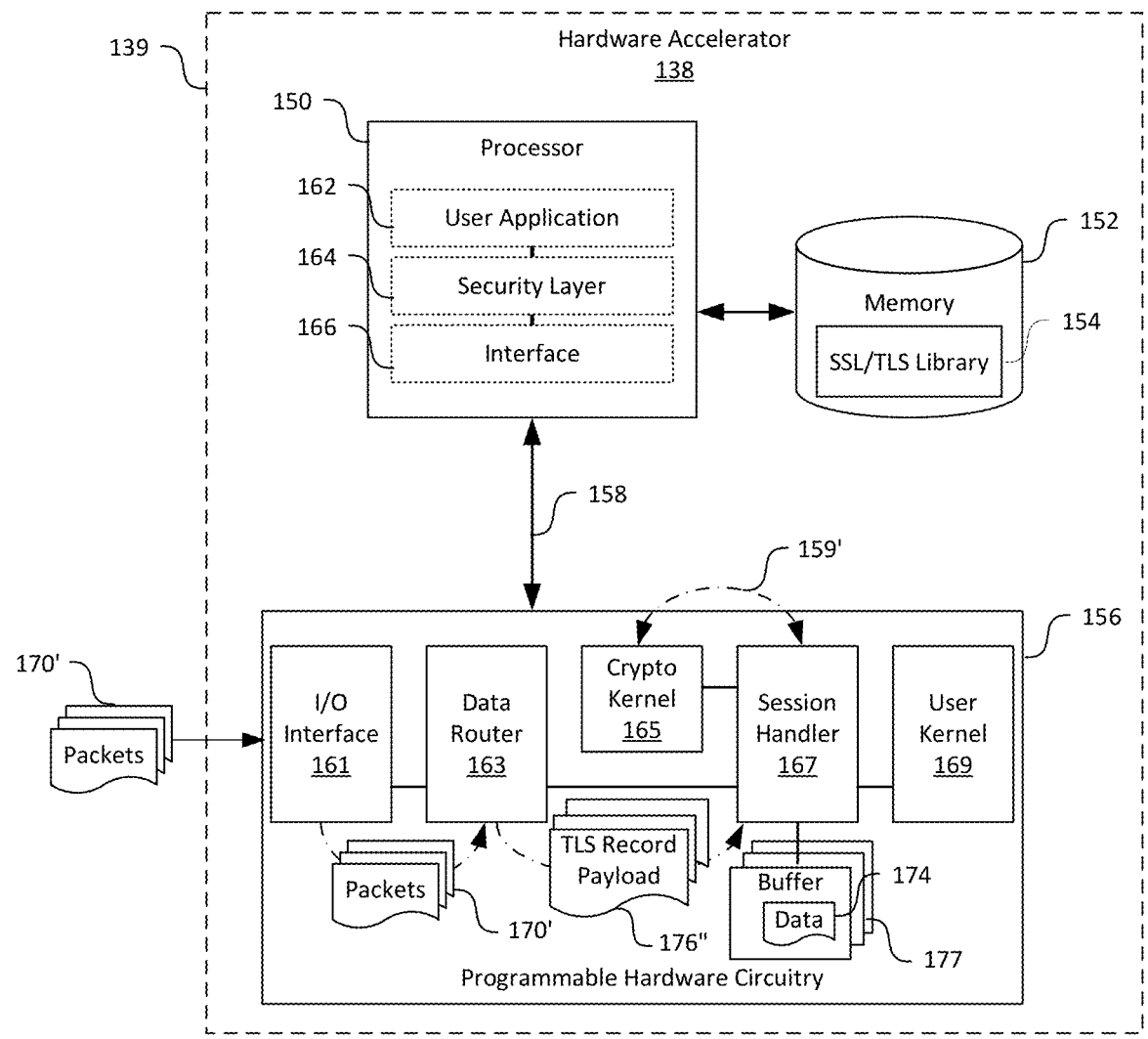

In response to determining that the incoming TLS record contains application data, the data router 163 can route the TLS record payload 176" to the session handler 167 instead of the interface component 166 of the accelerator processor 150. As shown in FIG. 4B, the session handler 167 can then cooperate with the crypto kernel 165 (as indicated by the arrow 159') to decrypt the TLS record payload 176" containing application data to generate decrypted data 174 as an incoming message. The session handler 167 can also fragment/combine, compress/decompress, or perform other suitable operations on the decrypted data 174 before storing the data 174 in one of the buffers 177 corresponding to a connection. In some embodiments, the session handler 167 may push the data 174 directly to the user kernel 169 when available, without storing the data 174 in the buffer 177 associated with the connection.

The session handler 167 can then provide the decrypted data 174 to the user kernel 169 for further processing according to configuration of the user kernel 169. In one example, the user kernel 169 can perform transcoding on the received data 174. In another example, the user kernel 169 can apply a digital filter to audio or video stream received in the data 174. In further examples, the user kernel 169 can perform other suitable operations on the received data 174.

Figure 4C:
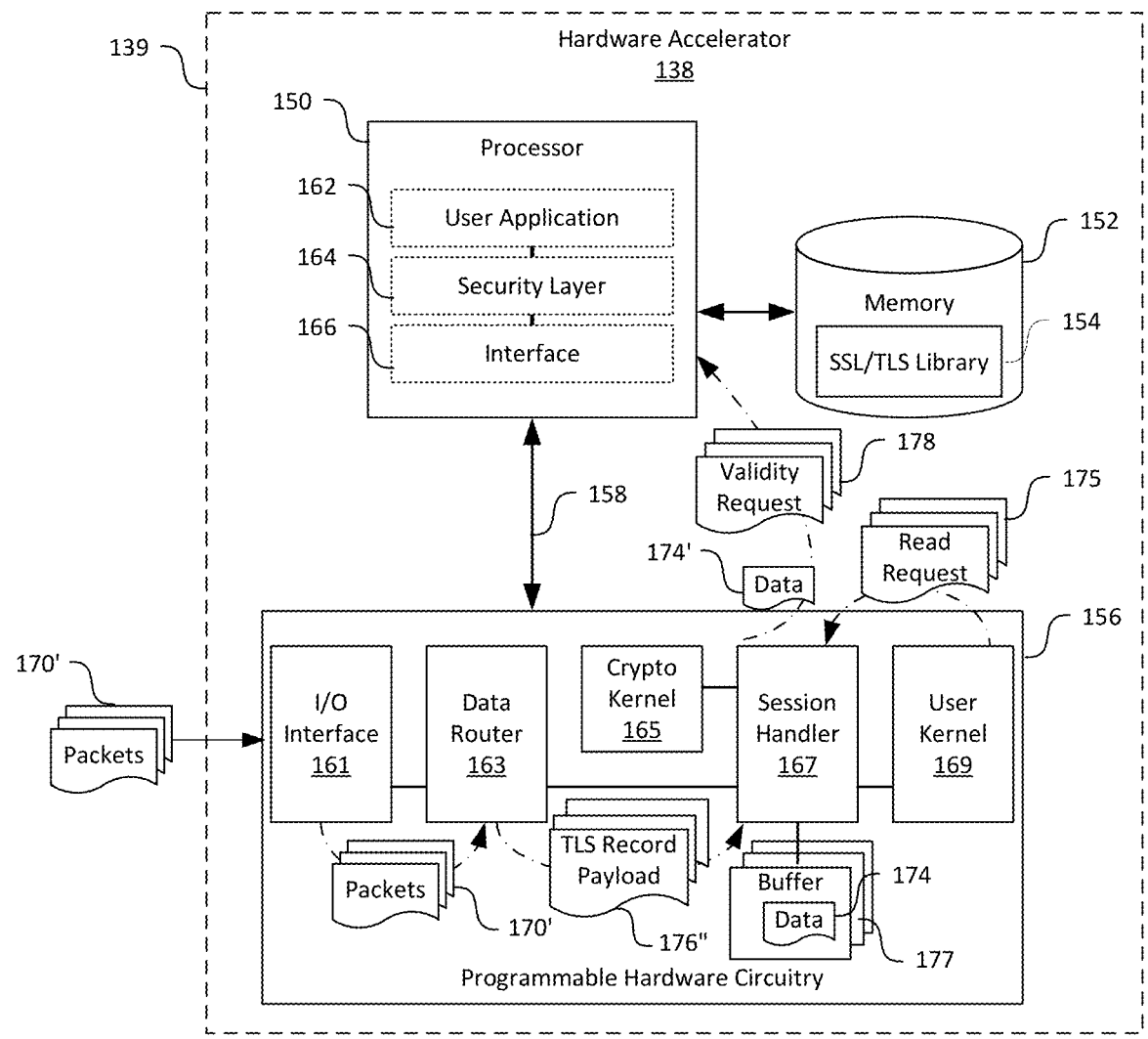
Figure 4D:
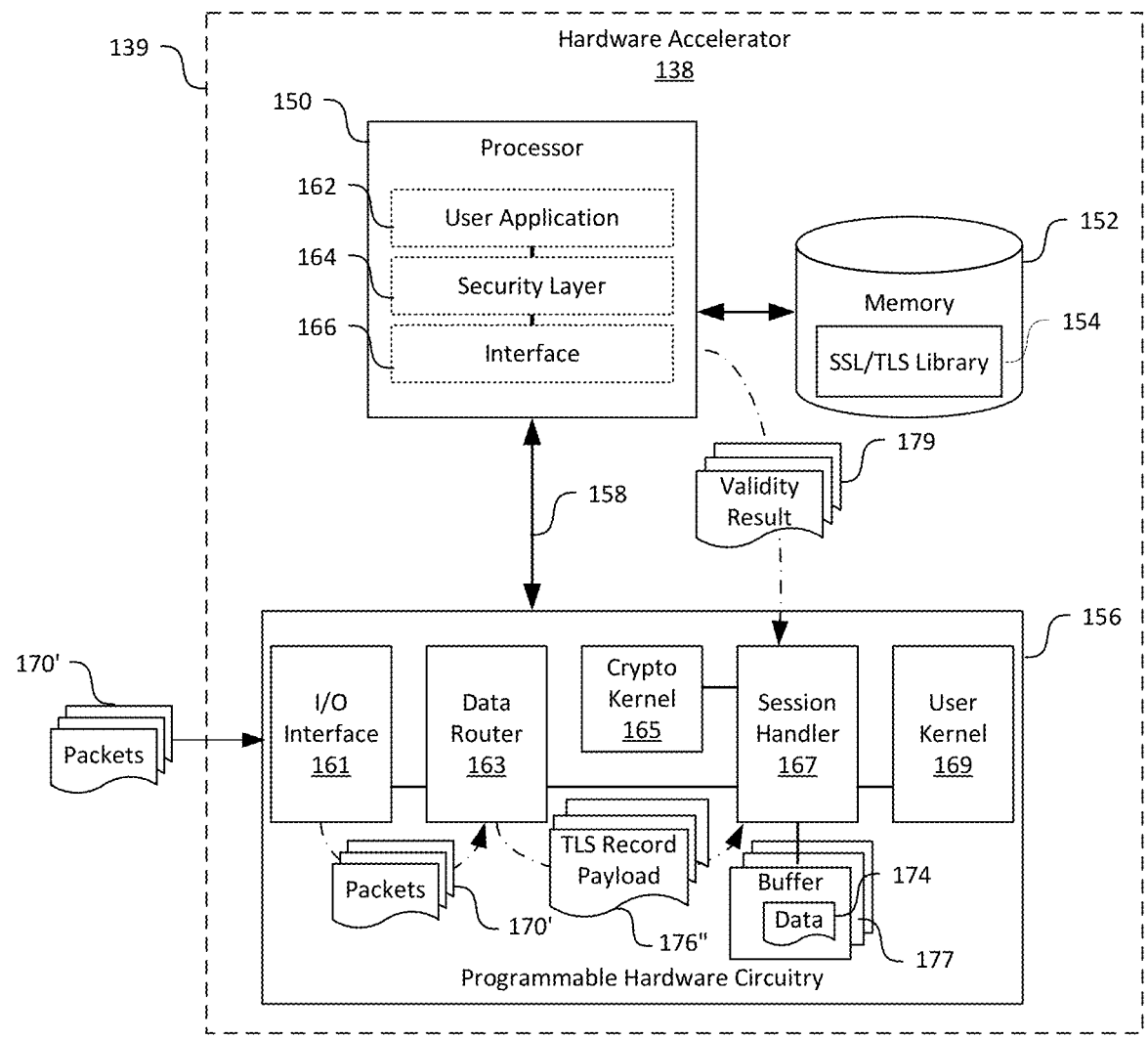

As described in more detail below with reference to FIGS. 4C-4E, the session handler 167 can also be configured to perform validity checking on the stored data 174 as representing an incoming message before providing the data 174 (or a portion thereof) to the user kernel 169 for further processing. For instance, as shown in FIG. 4C, in response to receiving an incoming TLS record payload 176" and a read request 175 from the user kernel 169, the session handler 167 can be configured to transmit, via the communications bridge 158, a validity request 178 to the user application 162 and/or security layer 164 executed by the accelerator processor 150 along with a beginning portion of the data 174' stored in the buffer 177. In one example, 4 kilobytes of data 174' (or a memory pointer thereto) may be transmitted to the accelerator processor 150. In another example, all data 174 in the buffer may be transmitted to the accelerator processor 150 provided a size of the data does not exceed a threshold (e.g., 4 kilobytes).

In other examples, the session handler 167 may transmit 8 kilobytes, 16 kilobytes, or other suitable sizes of the data in the buffer 177 to the accelerator processor 150. The data 174' transmitted along with the validity request 178 may contain totally or partially the header of the record of the protocol encapsulated in the TLS record payload. For example, if the data 174' present in the TLS record payload is an HTTP message, the validity request 178 may contain the corresponding HTTP header.

In response to receiving the validity request 178 and at least a portion of the data 174' representing the incoming message, the accelerator processor 150 can be configured to parse the received data 174' and recognize a header (e.g., an HTTP header, not shown) included in the decrypted data 174'. By examining the header, the accelerator processor 150 can determine whether a payload associated with the header is valid for the purposes of the user kernel 169, a payload size for the encapsulated record (e.g., HTTP payload of 200 kilobytes), or other suitable parameters of the decrypted application data. For instance, if a status field in an HTTP header contains a value of "200," then the accelerator processor 150 can indicate that the HTTP payload is valid. On the other hand, when the status field in the HTTP header contains a value of "403," then the accelerator processor 150 can indicate that the HTTP payload is invalid. An example of header fields according to HTTP is described in more detail below with reference to FIG. 5B. The accelerator processor 150 can then transmit a validity result 179 containing information to determine the size of the HTTP payload and the HTTP header of the HTTP message received. The validity response 179 may also contain one or more of the foregoing parameters to the session handler 167, as shown in FIG. 4D.

Figure 4E:
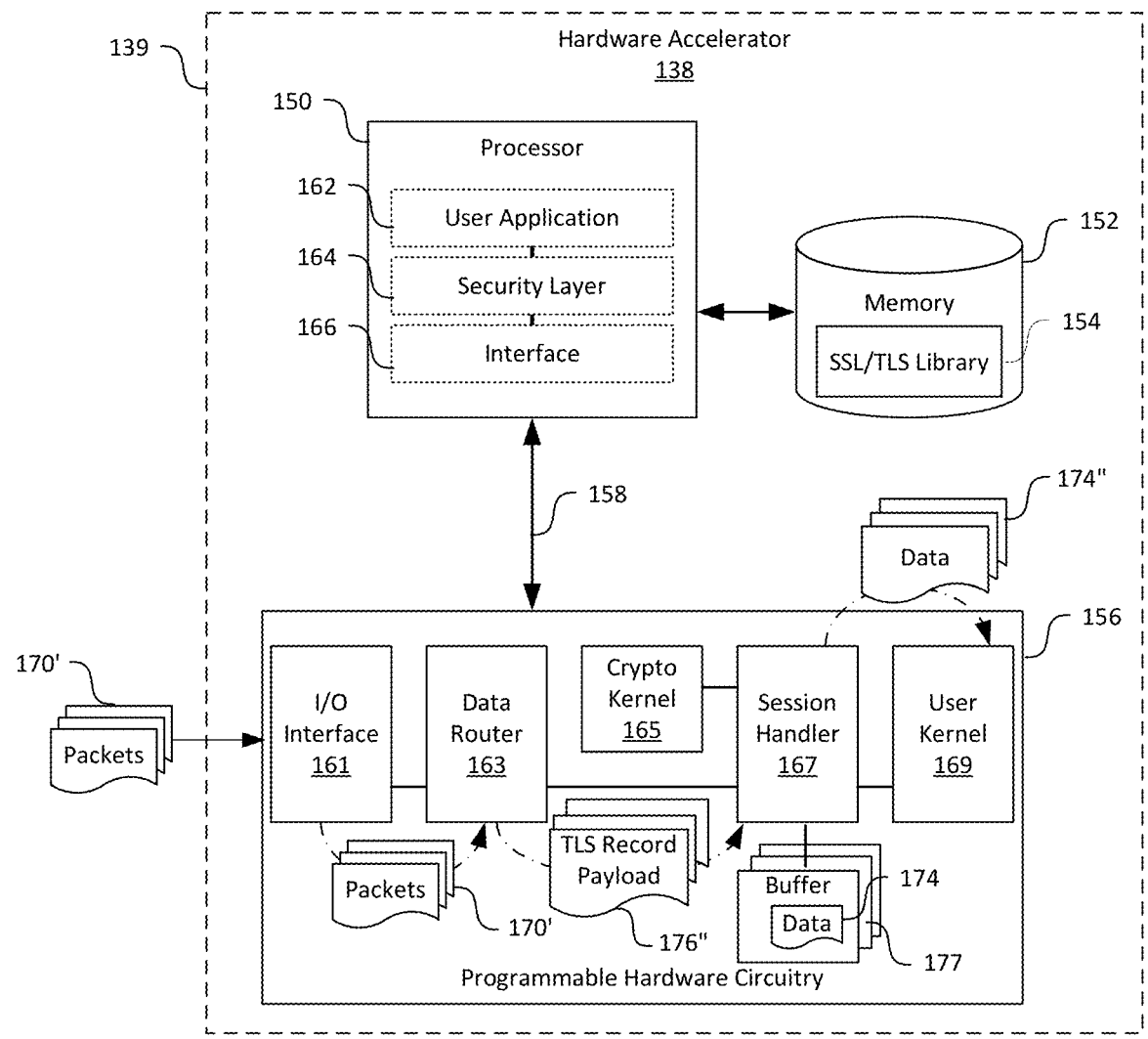

FIG. 4E illustrates a scenario when the validity result 179 indicates that the content included in the data 174 is valid. In response to receiving the validity result 179, the session handler 167 can be configured to remove the header of the encapsulated message contained in the data 174 based on the header size or the payload size included in the validity result 178 to extract data 174" representing a payload included in the content of the encapsulated message. Upon receiving the read request 175 (FIG. 4C) issued by the user kernel 169, the session handler 167 provides only the payload 174" of the data 174 to the user kernel 169 for further processing. In another scenario when the validity result 179 indicates that there was insufficient data associated with the received data 174 (FIG. 4D), the session handler 167 can pause for a predetermined period of time (e.g., 5 seconds) to allow for more data to arrive and repeat the operations shown in FIGS. 4C and 4D. In yet another scenario when the validity result 179 indicates that the payload of the data 174 is invalid, the session controller 167 can discard all or at least a portion of the data 174 currently in the buffer 177, terminate the secure communications session, indicate a read error to the user kernel 169 or processor 150, or perform other suitable operations.

Several embodiments of the disclosed technology can thus reduce or even prevent overloading the communications bridge 158 between the programmable hardware circuitry 156 and the accelerator processor 150. As described above with reference to FIGS. 3A-4E, by implementing the session handler 167 in the programmable hardware circuitry 156 to handle application data processing, encryption/decryption of any application data in a data stream would not leave the programmable hardware circuitry 156 and cross the communications bridge 158 to the accelerator processor 150, with the exception of an infrequent sharing of a small amount of data for a validity check in some embodiments. Thus, from the perceive of the accelerator processor 150, the secure communications session appears as if never receiving any data, yet the communications session is valid. From the perspective of the programmable hardware circuitry 156, the secure communications session appears as if a secured connection is initiated without any handshaking overhead.

As such, overhead in terms of data transfer over the communications bridge 158 can be reduced to enable higher throughput (e.g., greater than 10 gigabit/second) at the hardware accelerator 138 when compared to other hardware accelerators.

Figure 5A:
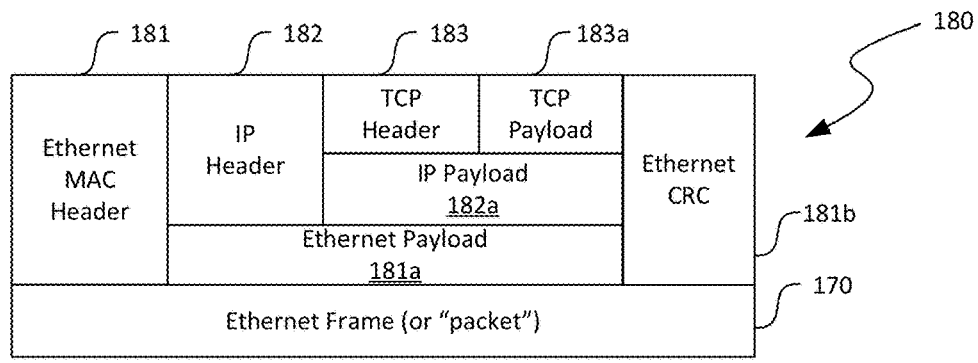
FIGS. 5A-5C are schematic diagrams illustrating a data schema suitable for a packet in accordance with embodiments of the disclosed technology.
Figure 5B:
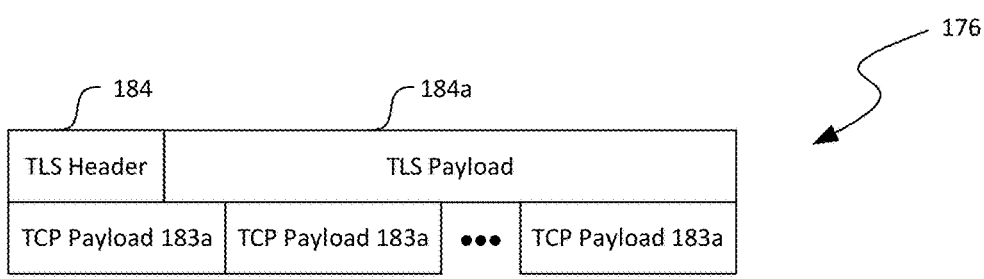

FIG. 5A is a schematic diagram illustrating a data schema 180 suitable for a packet 170 in accordance with embodiments of the disclosed technology. As shown in FIG. 5A, the data schema 180 can include layered protocol records each having a header and a payload. For example, the packet 170 can include an Ethernet record having a MAC header field 181, a payload 181a, and an Ethernet cyclic redundancy check field 181b. The Ethernet payload 181a can in turn contain an IP header field 182 and an IP payload 182a. As shown in FIG. 5A, the IP payload 182a can further contain a TCP header field 183 and a TCP payload 183a. As shown in FIG. 5B, TLS records 176 each containing a TLS record header 184 and a TLS payload 184a can be encoded in one or more consecutive TCP payloads 183a. In turn, as shown in FIG. 5C, one or more consecutive TLS record payloads 184a can contain one or more encoded HTTP records 185 each with a HTTP header field 186 and a HTTP payload 186a because a size of the HTTP records 185 can be larger than a size of a single TLS record payload 184a.

The MAC header field 181, the IP header field 182, and the TCP header field 183 can be configured to contain a MAC address, an IP address, and a TCP port number for the TCP/IP connection to the hardware accelerator 138 (FIG. 2) and/or the host 106 (FIG. 2), respectively. The TLS header field 184 can be configured to contain a value indicating a type of data contained in TLS records 176. Example values for the TLS header field 184 can include APPLICATION_DATA, CHANGE_CIPHER_SPEC, ALERT, or HANDSHAKE. The HTTP header field 186 can be configured to contain various parameters according to the HTTP protocol. For example, the parameters can include a content length of the data in the HTTP payload field 186a, cache control, etc. Example header fields of the HTTP header 186 are described in more detail with reference to FIG. 5D. Even though the example data schema 180 includes the HTTP header field 186 and HTTP payload 186a, in other embodiments, the data schema 180 can also include Secure Shell ("SSH"), Secure Copy ("SCP"), Secure File Transfer Protocol ("SFTP"), or other suitable protocols encapsulated under SSL/TLS.

Figure 5C:
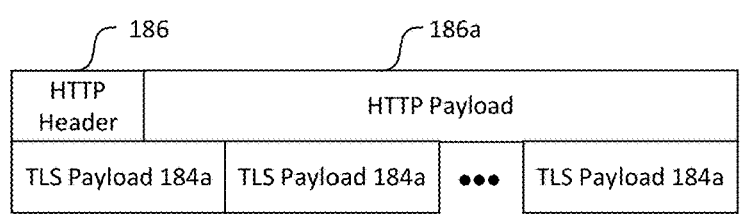
Figure 5D:
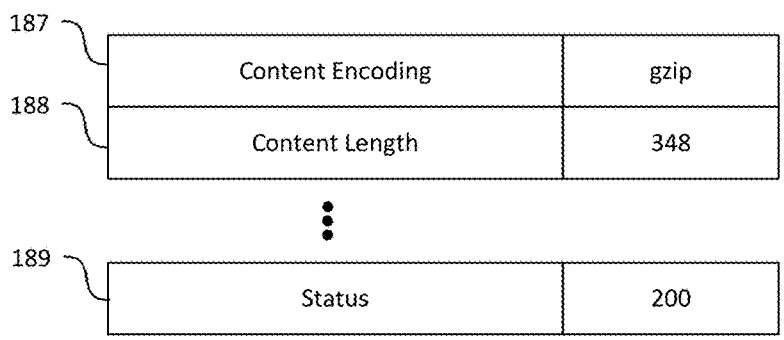
FIG. 5D is a schematic diagram illustrating example header fields according to HTTP in accordance with embodiments of the disclosed technology.

FIG. 5D is a schematic diagram illustrating example header fields suitable for the HTTP header 186 in FIG. 5C in accordance with embodiments of the disclosed technology. As shown in FIG. 5D, the header fields can include a content encoding field 187 configured to contain an encoding identification, a content length field 188 configured to store a content or payload length in, for instance, bytes, and a status field 189 configured to contain a numerical value indicating whether the content or payload associated with the HTTP header is valid. In the illustrated example, the content encoding field 187 contains "gzip" as an encoding identifier; the content length field 188 contains "348" indicating that the content or payload is 348 bytes long; and the status field 189 contains a numerical value of "200" indicating that the content or payload is valid. Though particular fields are shown in FIG. 5B as examples, in other embodiments, the HTTP header 186 can also include fields configured to contain content language, content location, content range, and/or other suitable parameters.

Figure 6:
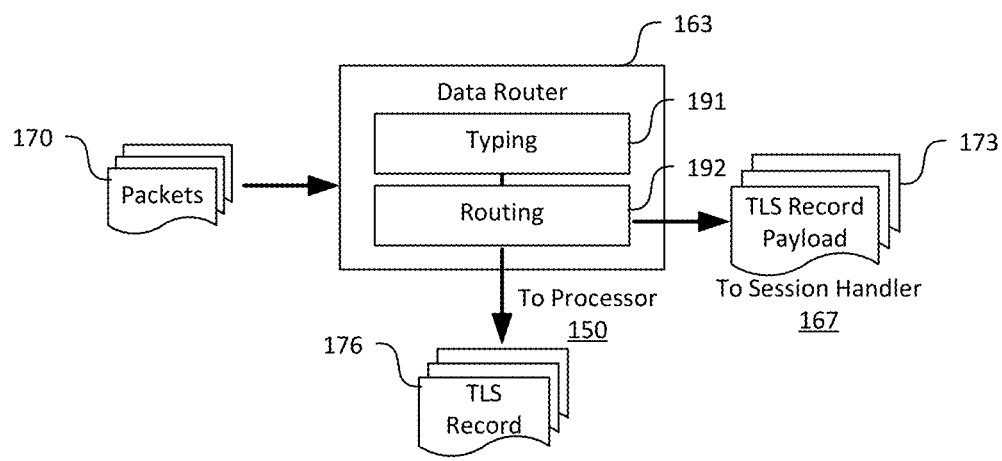
FIGS. 6 and 7 are schematic diagram illustrating certain hardware/software components of a data router and a session handler, respectively, in accordance with additional embodiments of the disclosed technology.
Figure 7:
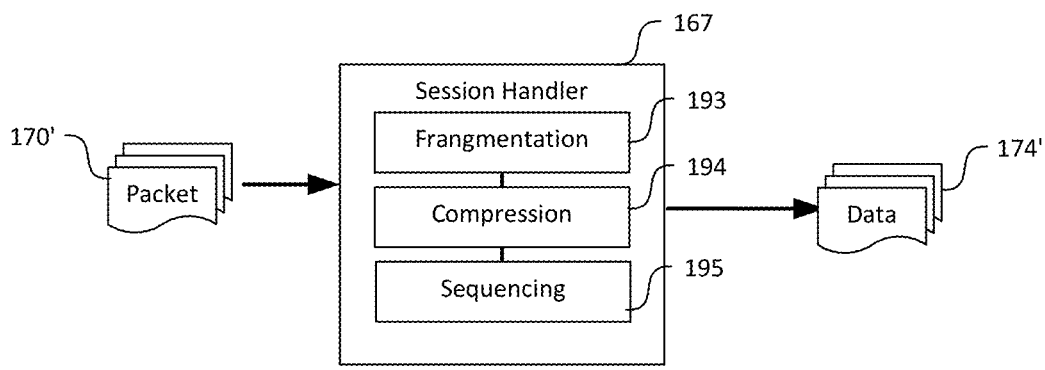

FIGS. 6 and 7 are schematic diagram illustrating certain hardware/software components of a data router 163 and a session handler 167, respectively, in accordance with additional embodiments of the disclosed technology. As shown in FIG. 6, the data router 163 can include a typing circuit 191 and a routing circuit 192 operatively coupled to one another. The typing circuit 191 can be configured to assemble a TLS record from data in incoming packets and analyze the header content of the assembled TLS record to determine a type of the assembled TLS record. As discussed above with reference to FIGS. 3A-4C, in certain embodiments, the typing circuit 191 can be configured to determine a type (e.g., application date or non-application data) of the TLS record by monitoring a TLS record header 184 (FIG. 5) of the TLS record. In other embodiments, the typing circuit 191 may detect the type of the packet 170 using other suitable techniques. The routing circuit 192 is configured to forward the packet 170 to either the session handler 167 (FIG. 3A) or the processor 150 (FIG. 3A) based on the type determined by the typing circuit 191.

As shown in FIG. 7, the session handler 167 can include a validity checker 193, a data controller 194, and a sequencing circuit 195 operatively coupled to one another to generate data 174'. The sequencing circuit 195 can be configured to monitor a sequence number associated with the packet 170 and/or modify the sequence number to so that the packet 170 can be acceptable by the accelerator processor 150 (FIG. 4C). In one example, the sequencing circuit 195 can be configured to track sequence numbers of previous packets containing session management messages processed by the accelerator processor 150. The sequencing circuit 195 can then modify the sequence number of the packet 170 such that the packet 170 appears to be consecutive to the previous packets containing session management messages. In another embodiment, the sequence number is altered in the TLS/SSL software stack (e.g., the security layer 164 in FIG. 3A) present in the accelerator processor 150.

The validity checker 193 can be configured to check a validity of content/payload included in the payload of the TLS record 176" ("encapsulated message" or "message") by transmitting a validity request 178 to the accelerator processor 150 along with at least a portion of the message. In response to the validity request 178, the accelerator processor 150 can validate the content/payload by analyzing values contained in the header of the message. The accelerator processor 150 can then transmit a validity result 179 to the session handler 167. The validity checker 193 can also be configured to receive the validity result 179 from the accelerator processor 150 and forward the validity result 179 to the data controller 194 for further processing.

Upon receiving the validity result 179, the data controller 194 can determine how to process the message based on information included in the validity result 179. For example, when the validity result 179 indicates that the content/payload is valid, the data controller 194 can be configured to remove a number of bytes from the message that correspond to the header of the message, and provide only the content/payload of the message to the user kernel 169 when a read request 175 is executed (FIG. 4D). In another example, when the validity result 179 indicates that the content/payload is invalid, the data controller 194 can be configured to discard all or at least a portion of the message currently in the buffer 177 (FIG. 4D), terminate the secure communications session, indicate a read error to the user kernel 169 and/or the user application 152, or perform other suitable operations. In other embodiments, the session handler 167 can also include a fragmentation circuit configured to fragment or combine data contained in the TLS record payload 176", a compression circuit configured to compress or decompress data contained in the TLS record payload 176", or other suitable types of circuit.

FIGS. 8A-9B are flowcharts illustrating various aspects of secure communication management in hardware accelerators in accordance with embodiments of the disclosed technology. Even though the processes are described below with reference to the distributed computing system 100 of FIG. 1, in other embodiments, the processes may be implemented in other suitable computing systems with additional and/or different components.

Figure 8A:
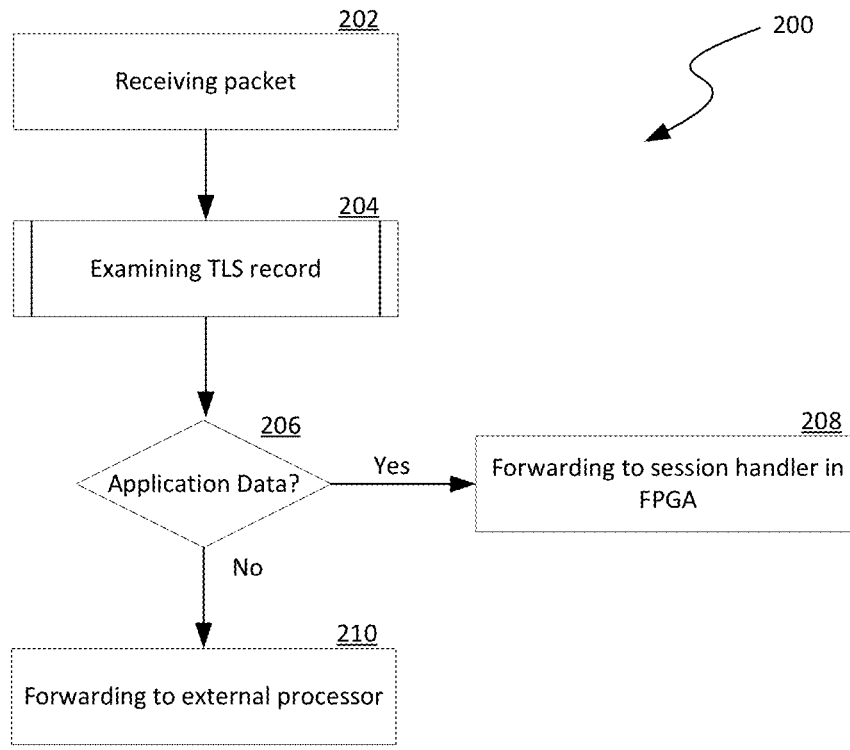
FIGS. 8A-9B are flowcharts illustrating various aspects of secure communication management in hardware accelerators in accordance with embodiments of the disclosed technology.

As shown in FIG. 8A, a process 200 can include receiving one or more packets at stage 202. The received packets can include one or more headers, as such those shown in FIG. 5A, or contain other suitable information. The process 200 can then include assembling the received packets into a TLS record and examining the assembled TLS record to determine whether the TLS record contains encrypted application data at stage 204. In certain embodiments, examining the TLS record can include determining whether a value contained in the header of the TLS record equals to APPLICATION_DATA, example operations of which are described in more detail below with reference to FIG. 8B.

The process 200 can then include a decision stage 206 to determine whether the TLS record contains application data. In response to determining that the TLS record contains application data, the process 200 can include forwarding the TLS record payload to a session handler implemented in the programmable hardware circuitry 156 (e.g., a FPGA) for further processing at stage 208. In response to determining that the TLS record does not contain application data, the process 200 can include forwarding the TLS record to an accelerator processor for further processing at stage 210.

Figure 8B:
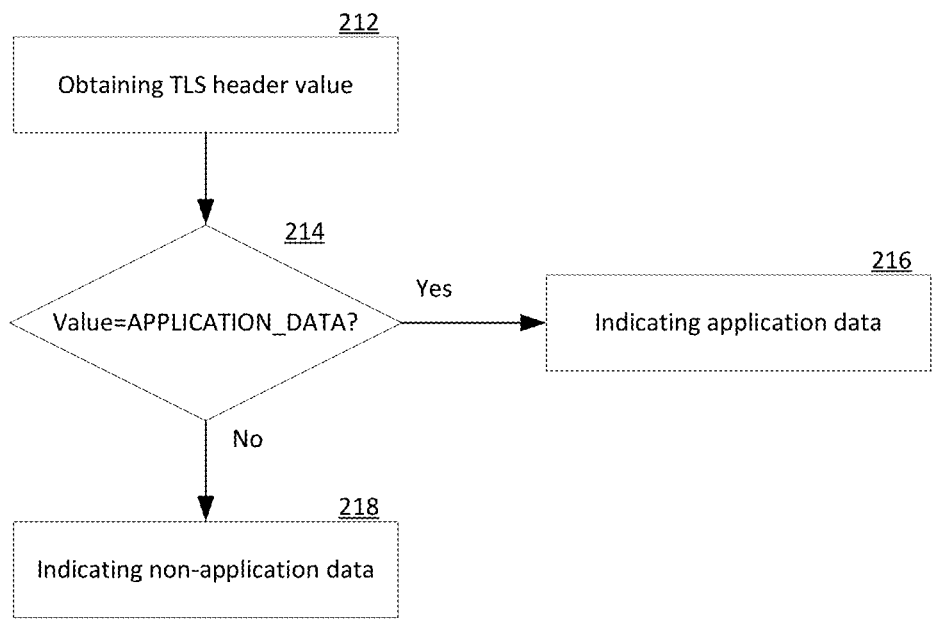

FIG. 8B is a flowchart illustrating example operations of examining a received TLS record. As shown in FIG. 8B, the operations can include obtaining a TLS header value of the TLS record by, for example, parsing the header of the TLS record, at stage 212. The operations can then include a decision stage 214 to determine whether the obtained TLS header value equals to APPLICATION_DATA. In response to determining that the obtained TLS header value equals to APPLICATION_DATA, the operations can include indicating that the TLS record contains application data at stage 216. In response to determining that the obtained TLS header value does not equal to APPLICATION_DATA, the operations can include indicating that the TLS record does not contain application data at stage 218.

Figure 9A:
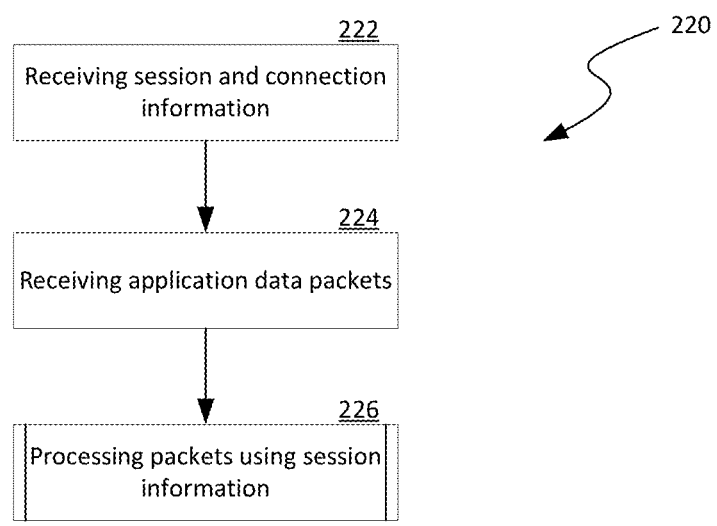

FIG. 9A is a flowchart illustrating a process 220 of processing packets at a session handler implemented in, for example, the programmable hardware circuitry 156 of FIG. 3A. As shown in FIG. 9A, the process 220 can include receiving session and connection information at stage 222. The session and connection information can include one or more of a session identification, connection identification, a session secret key, a cryptographic algorithm, a hash algorithm, or a compression algorithm of a secure communications session related to the packets. The process 220 can then include receiving packets containing TLS records containing application data at stage 224. The process 220 can further include processing the received packets by assembling the packets into TLS records with application data and using the received session information to process the TLS records at stage 226. In certain embodiments, processing the received packets can include decrypt the payloads of the TLS records, fragmenting or combining the application data into a target data structure, numbering a sequence of data blocks in the application data, or compressing or decompressing the application data contained in the received TLS records using the compression algorithm identified in the received session information. In other embodiments, processing the packets can also include performing a validity checking on the incoming TLS records. Example operations of performing validity checking are described in more detail below with reference to FIG. 9B.

Figure 9B:
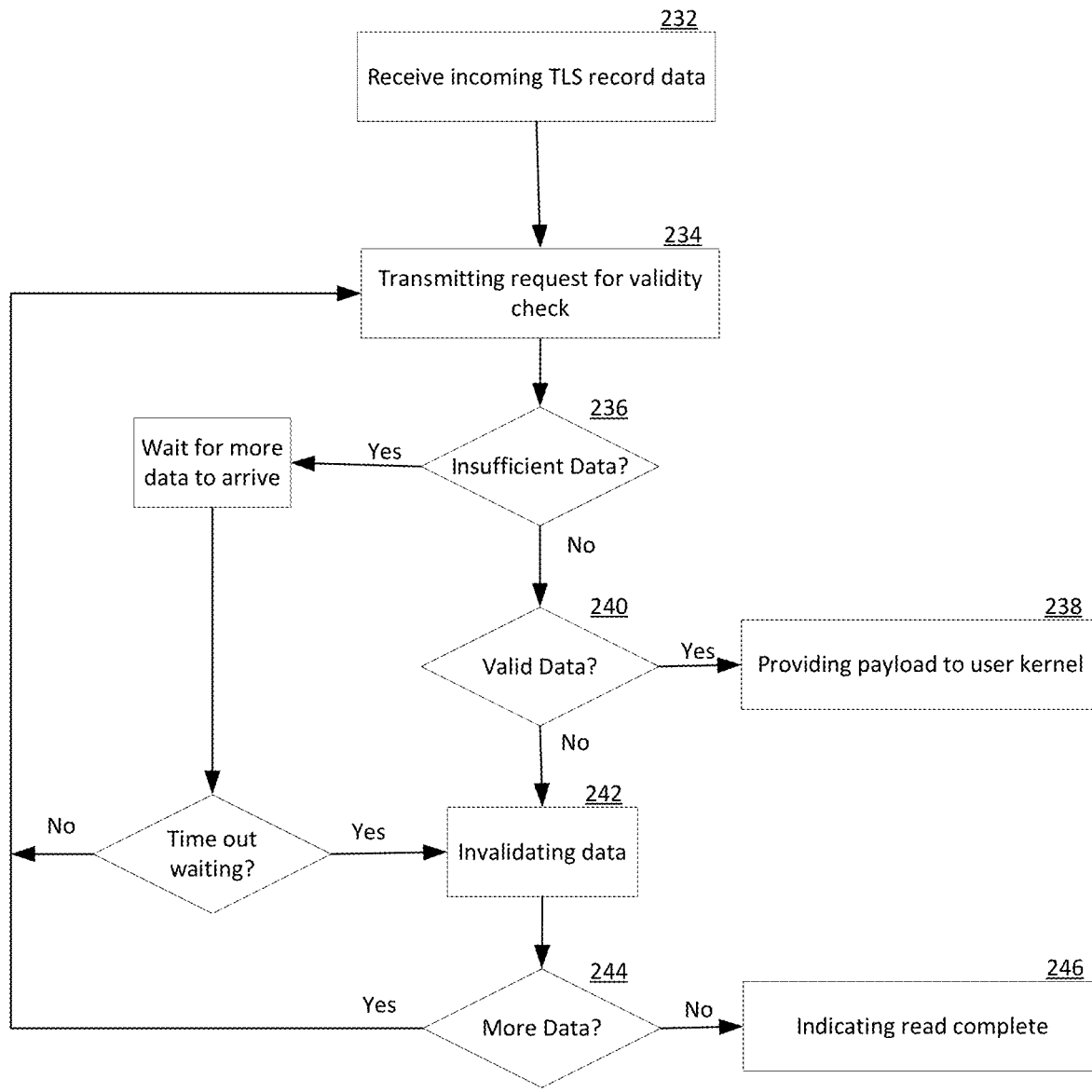

As shown in FIG. 9B, example operations for performing validity checking can include receiving an incoming TLS record data at stage 232. The operations can then include transmitting a validity request from the session handler 167 (FIG. 4C) to the accelerator processor (FIG. 4C) at stage 234. In certain embodiments, the validity request can include invoking an Application Programming Interface ("API") on the accelerator processor 150. The following is an example API callback ("valid_response") for requesting the validity checking.

int valid_response(char const*buffer, size_t gbs, size_t*ths, size_t*ps)

where buffer contains a memory pointer to data to be checked and gbs contains the amount of data to be checked (e.g., buffer size in bytes); upon execution of the "valid_response" request by the accelerator processor 150, ths returns the size in bytes of the header to skip (i.e., if the TLS record payload contains an HTTP message, ths returns the size of the HTTP message's header). Also, ps returns the size in bytes of the payload (i.e., if the TLS record payload contains an HTTP message, ps returns the size of the HTTP body). Further, the "valid_response" callback returns a value of "0" if the data passed to the request in buffer is determined to be valid (e.g., a HTTP status code 200 and the data in buffer is of sufficient length to determine header length). The "valid_response" request can also return "1" if the data is not large enough to decide validity. The "valid_response" request can also return "2" if an error is detected. Though particular implementation techniques are shown in the above example, in other embodiments, other suitable technique/values may be used to implement the validity checking operations.

The operations can then include a decision stage 236 to determine whether enough data is present to make a decision. In response to determining that insufficient data is detected, the operations include pausing for a predetermined period to wait for more incoming data and retransmit another request for validity check by reverting to stage 234. In the case of waiting for additional data, if no data arrives before a predetermined time out period, the request is deemed invalid and the flow is directed to invalidating data 242. If enough data to attempt validation has been received, the operations can include a decision stage 240 to determine valid content/payload based on the received validity result. In response to determining that the content/payload is valid, the operations 238 include providing the content/payload of the message to the user kernel after removing the message's header based on the header size included in the validity result. Otherwise, the operations proceed to invalidating data at stage 242. Example operations of invalidating the data can include discarding all data from the buffer, closing the secure communications session, indicate a read error to the user kernel, or perform other suitable operations. The operations can further include another decision stage 244 to determine whether any additional data is present in the buffer. In response to determining that additional data is present in the buffer, the operations revert to transmitting another request for validity check at stage 234; otherwise, the operations include indicating that the read operation is complete at stage 246.

Figure 10:
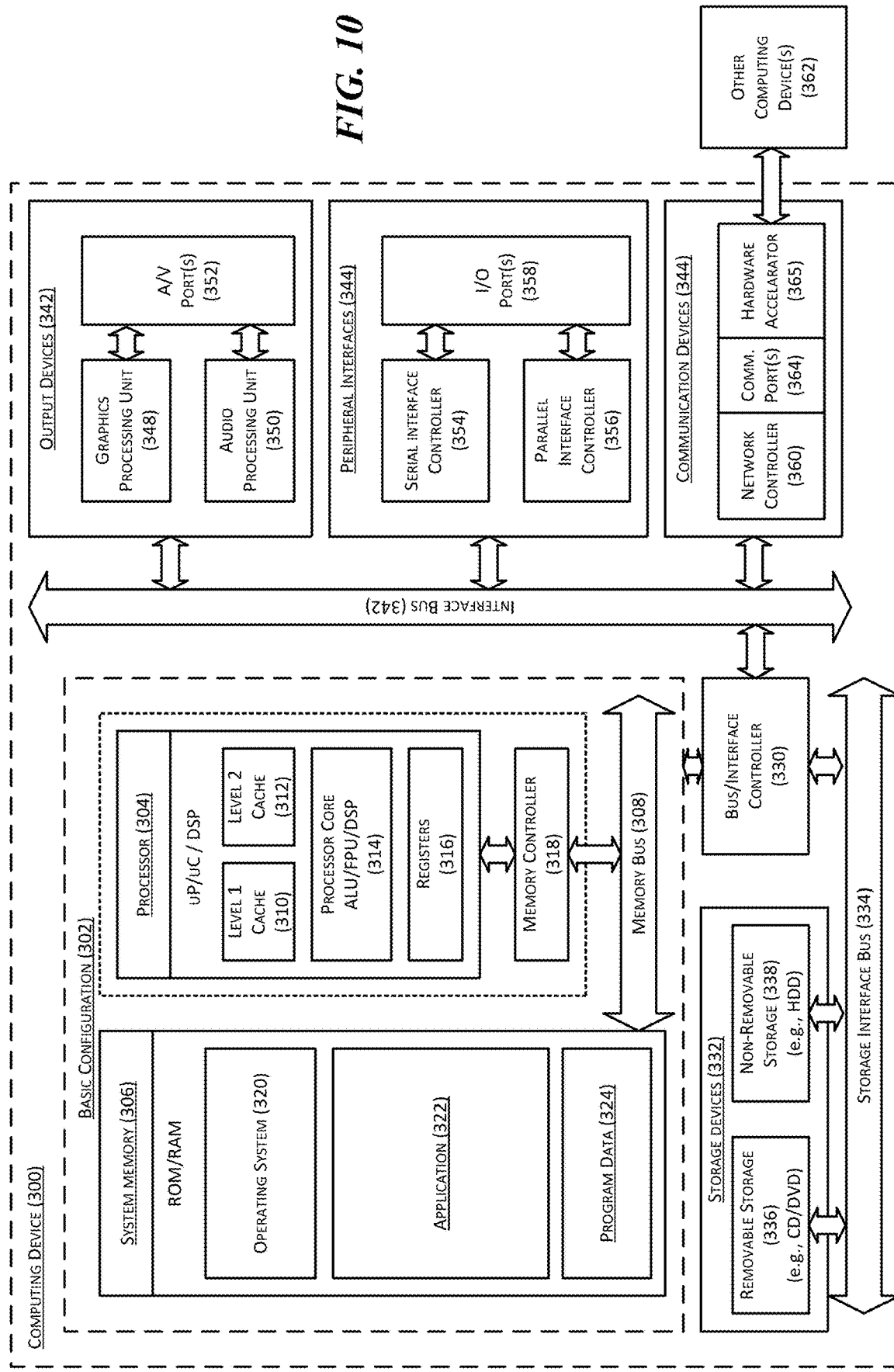
FIG. 10 is a computing device suitable for certain components of the distributed computing system in FIG. 1.

FIG. 10 is a computing device 300 suitable for certain components of the hybrid cloud computing system 100 in FIG. 1. For example, the computing device 300 can be suitable for the hosts 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated or other types of signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360 and a hardware accelerator 365, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of facilitating secure communication management in a hardware accelerator containing a programmable hardware circuitry coupled to a processor external to the programmable hardware circuitry via a communications bridge, the programmable hardware circuitry having a buffer and a user kernel configured to perform a user function, wherein the method comprising:

transmitting, from the programmable hardware circuitry and via the communications bridge, to the processor, data representing a request to validate content of a message stored in the buffer, the message being secured using a Secure Sockets Layer or Transport Layer Security protocol;

performing, at the processor, a validity check on the content of the secured message based on the request from the programmable hardware circuitry;

transmitting, from the processor via the communications bridge, data representing a validation result regarding the message to the programmable hardware circuitry, the validation result containing an indication whether the content in the message is valid and a header size or a payload size of the message; and when the indication indicates that the content of the message is valid, removing, with the programmable hardware circuitry, a header contained in the message from the message in the buffer according to the header size or the payload size indicated in the validation result, to extract a payload of the message; and providing the extracted payload to the user kernel.

2. The method of claim 1, further comprising when the indication indicates that the content of the message is invalid, performing, at the programmable hardware circuitry, at least one of:

discarding all data associated with the message currently in the buffer;

terminating the secure communications session and/or connection; or indicating a read error to the user kernel or the processor external to the programmable hardware circuitry.

3. The method of claim 1, further comprising when the indication indicates that the message has insufficient data to determine validity, at the programmable hardware circuitry waiting for a predetermined period of time for additional data belonging to the message to arrive and repeating the transmitting and receiving operations upon receiving the additional data belonging to the message.

4. The method of claim 1, further comprising:

when the indication indicates that the message has insufficient data to determine validity, at the programmable hardware circuitry waiting for a predetermined period of time for additional data belonging to the message to arrive; and upon detecting that no additional data arrive before the predefined period of time, performing, at the programmable hardware circuitry, at least one of:

discarding all data associated with the message currently in the buffer;

terminating the secure communications session and/or connection; or indicating a read error to the user kernel or the processor external to the programmable hardware circuitry.

5. The method of claim 1 wherein transmitting the data representing the request to validate includes transmitting the request containing (i) an indication of memory location of the message and a data size to be checked or (ii) a total or partial copy of the content of the message and a size of data copied from the message.

6. The method of claim 1 wherein transmitting the data representing the request to validate includes transmitting a request containing an indication of memory location of the message and a data size to be checked, the data size being a predetermined fixed size smaller than a total size of the message.

7. The method of claim 1 wherein performing the validity check includes:

executing instructions, at the processor, to identify one or more fields of a Hypertext Transfer Protocol ("HTTP") header contained in the message; and indicating that the content of the message is valid when a status code field contains a value corresponding to a valid indicator; or indicating that the content of the message is invalid when the status code field contains another value corresponding to an invalid indicator or when the status code field is not present in the HTTP header.

8. The method of claim 1 wherein performing the validity check includes:

executing instructions, at the processor, to identify one or more fields of a Hypertext Transfer Protocol ("HTTP") header contained in the message present in a buffer;

determining whether the buffer contains sufficient data to determine a size of the HTTP header and a size of a HTTP payload; and in response to determining that the buffer does not contain sufficient data, indicating, in the validity result, that validation check cannot be performed.

9. The method of claim 1, further comprising:

determining, at the programmable hardware circuitry, whether additional data is present after providing the extracted content of the message to the user kernel; and in response to determining that additional data is present, repeating the transmitting and performing operations for the additional data.

10. A hardware accelerator, comprising:

a field programmable gate array ("FPGA");

a processor external to the FPGA, the processor being coupled to the FPGA via a communications bridge;

a buffer operatively coupled to the FPGA and the processor; and a memory containing instructions executable by the processor to cause the processor to:

receive, via the communications bridge from the FPGA, data representing a validation request from the FPGA for validating content contained in a message stored in the buffer, the message being secured using a Secure Sockets Layer or Transport Layer Security protocol;

in response to receiving the validation request from the FPGA, identify a status header field contained in the message according to Hypertext Transfer Protocol ("HTTP");

determine whether the identified status header field contains a value that is indicative of the content in the message being valid; and in response to determining that the status header field is present and contains a value that is indicative of the content in the message being valid, generate and transmit, via the communications bridge to the FPGA, data representing a validation result containing an indicator indicating that the message contains valid content.

11. The hardware accelerator of claim 10 wherein the memory contains additional instructions executable by the processor to cause the processor to:

in response to determining that the status header field contains a value that is indicative of the content in the message being invalid, generate and transmit, via the communications bridge and to the FPGA, data representing a validation result containing an indicator indicating that the content of the message is invalid.

12. The hardware accelerator of claim 10 wherein the data representing the validation request contains a memory pointer and a data size of the message to be checked, and wherein the memory contains additional instructions executable by the processor to cause the processor to:

access data in the buffer according to the memory pointer and the data size indicated in the validation request;

determine whether sufficient data is present to perform the requested validity check; and in response to determining that sufficient data is present to perform the validity check, perform the identify, determine, generate and transmit operations.

13. The hardware accelerator of claim 10 wherein the data representing the validation request contains a memory pointer and a data size of the message to be checked, and wherein the memory contains additional instructions executable by the processor to cause the processor to:
  access data in the buffer according to the memory pointer and the data size indicated in the validation request;
  determine whether sufficient data is present to perform the requested validity check; and
  in response to determining that sufficient data is not present to perform the validity check, generate and transmit, via the communications bridge and to the FPGA, data representing a validation result containing an indicator indicating that the message has insufficient data for performing a validity check.

14. A method of facilitating secure communication management in a hardware accelerator containing a programmable hardware circuitry coupled to a processor external to the programmable hardware circuitry via a communications bridge, the programmable hardware circuitry having a buffer and a user kernel configured to perform a user function, wherein the method comprising:
  at the programmable hardware circuitry,
    receiving a data request from the user kernel, the data request requesting to read a message stored in the buffer, the message being secured using a Secure Sockets Layer or Transport Layer Security protocol;
    in response to receiving the data request from the user kernel, transmitting, via the communications bridge to the processor, data representing a request to validate content in the message;
    receiving, via the communications bridge from the processor, data representing a validation result of the message, the validation result containing an indication whether the content in the message is valid and at least one of a header size of the message or a payload size of the message; and
    when the indication indicates that the content of the message is valid, removing a header from the message according to the header size or the payload size in the validation result to extract a payload from the message and providing the extracted payload to the user kernel for processing.

15. The method of claim 14 wherein the validation request includes a memory pointer and a data size related to the message stored in the buffer or a total or partial copy of the content in the message and a size of the content copied.

16. The method of claim 14, further comprising when the indication indicates that the content of the message is invalid, performing at least one of:
  discarding all data associated with the message currently in the buffer;
  terminating the secure communications session and/or connection; or
  indicating a read error to the user kernel or the processor external to the programmable hardware circuitry.

17. The method of claim 14, further comprising when the indication indicates that the message has insufficient data to determine validity, pausing for a predetermined period of time before repeating the transmitting and receiving operations.

18. The method of claim 14 wherein transmitting the data representing the request to validate includes transmitting the request containing an indication of memory location of the message and a data size of the message to be checked.

19. The method of claim 14 wherein transmitting the data representing the request to validate includes transmitting a request containing an indication of memory location of the message and a data size of the message to be checked, the data size being a predetermined fixed size smaller than a total size of the message.

20. The method of claim 14 wherein transmitting the data representing the request to validate includes transmitting a request containing an indication of memory location of the message and an indication to check all data of the message.

* * * * *